United States Patent
Gunji et al.

[19]

[11] Patent Number: 5,926,117
[45] Date of Patent: Jul. 20, 1999

[54] VEHICLE CONTROL SYSTEM, VEHICLE MOUNTING APPARATUS, BASE STATION APPARATUS AND VEHICLE CONTROL METHOD

[75] Inventors: Yasuhiro Gunji, Hitachiota; Hiroshi Kuroda, Hitachi; Kozo Nakamura, Hitachiota; Hiroshi Takenaga, Ibaraki-ken, all of Japan

[73] Assignee: Hitachi, Ltd., Tokyo, Japan

[21] Appl. No.: 09/094,504

[22] Filed: Jun. 10, 1998

[30] Foreign Application Priority Data

Jun. 10, 1997 [JP] Japan ..................................... 9-151881

[51] Int. Cl.$^6$ .................................................. G08G 1/123
[52] U.S. Cl. .......................... 340/988; 340/991; 342/46; 342/457
[58] Field of Search ..................................... 340/436, 435, 340/961, 988, 903, 989, 990, 991, 992, 993, 994, 995; 701/200, 213, 214, 215, 301; 342/46, 455, 456, 457

[56] References Cited

U.S. PATENT DOCUMENTS

| | | | |
|---|---|---|---|
| 4,986,384 | 1/1991 | Okamoto et al. | 180/167 |
| 5,504,482 | 4/1996 | Schreder | 340/995 |
| 5,548,515 | 8/1996 | Pilley et al. | 340/961 |
| 5,563,786 | 10/1996 | Torii | 701/23 |
| 5,568,030 | 10/1996 | Nishikawa et al. | 318/587 |
| 5,592,180 | 1/1997 | Yokev et al. | 342/450 |
| 5,719,771 | 2/1998 | Buck et al. | 340/988 |
| 5,740,047 | 4/1998 | Pilley et al. | 340/961 |
| 5,774,701 | 6/1998 | Konishi et al. | 340/988 |

FOREIGN PATENT DOCUMENTS

| | | |
|---|---|---|
| 44 34 789 | 4/1996 | Germany . |
| WO 91/09275 | 6/1991 | WIPO . |
| WO 95/01607 | 1/1995 | WIPO . |
| WO 95/28524 | 10/1995 | WIPO . |
| WO 95/31759 | 11/1995 | WIPO . |

OTHER PUBLICATIONS

Technical Report of IEICE (The Institute of Electronics, Information and Communication Engineers of Japan), "Placing Intelligence on Road Traffic", SANE96–49.

Tsuchiya and Tuji, "Basis of GPS Measuremetn", Nippon Sokuryou Kyoukai (1995).

*Primary Examiner*—Jeffery A. Hofsass
*Assistant Examiner*—Van Tu Trieu
*Attorney, Agent, or Firm*—Evenson, McKeown, Edwards & Lenahan, P.L.L.C.

[57] ABSTRACT

A vehicle control system and method which can realize automatic driving of a vehicle under control of a base station with a high accuracy of the order of cm, low costs and a high reliability. On the basis of information relating to positions or speeds of other vehicles or fixed vehicles obtained through communication units installed in the vehicles and base station, the system know presence of vehicles in proximity to each vehicle, proximity distances, proximity directions or relative speeds thereof, informs an associated driver of it, or controls movement states of the proximity vehicles to avoid any contact with the proximity vehicles on the basis of the proximity information.

2 Claims, 15 Drawing Sheets

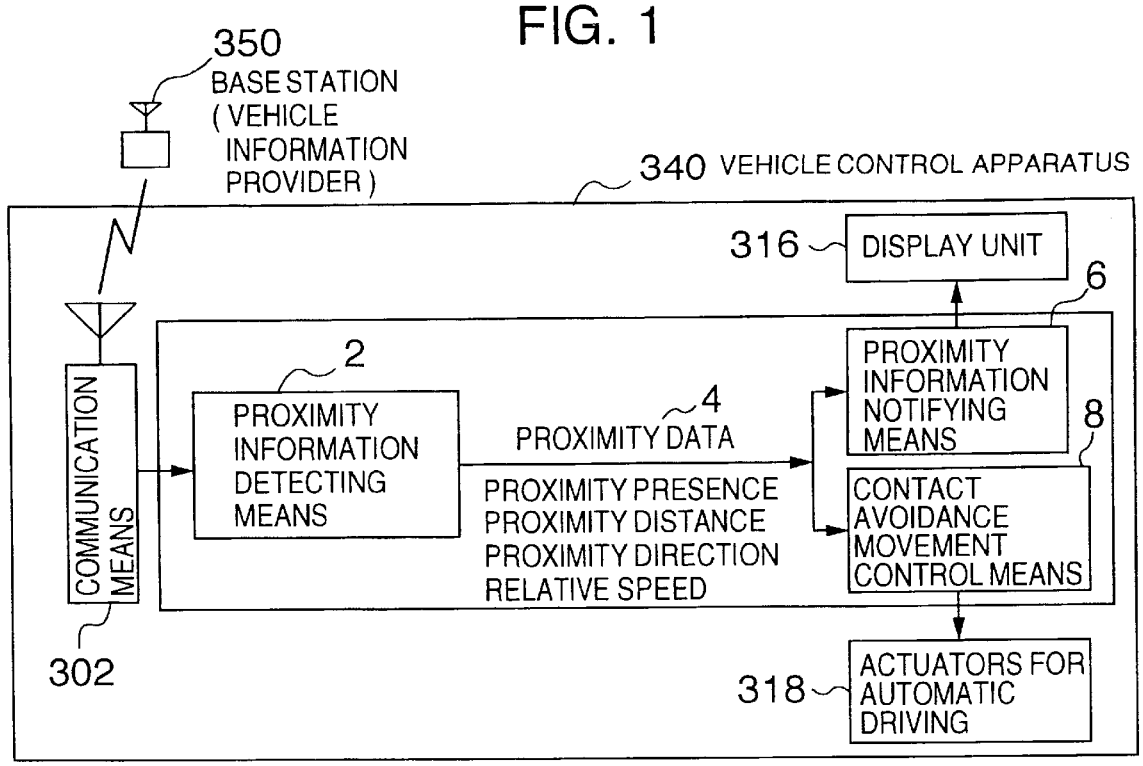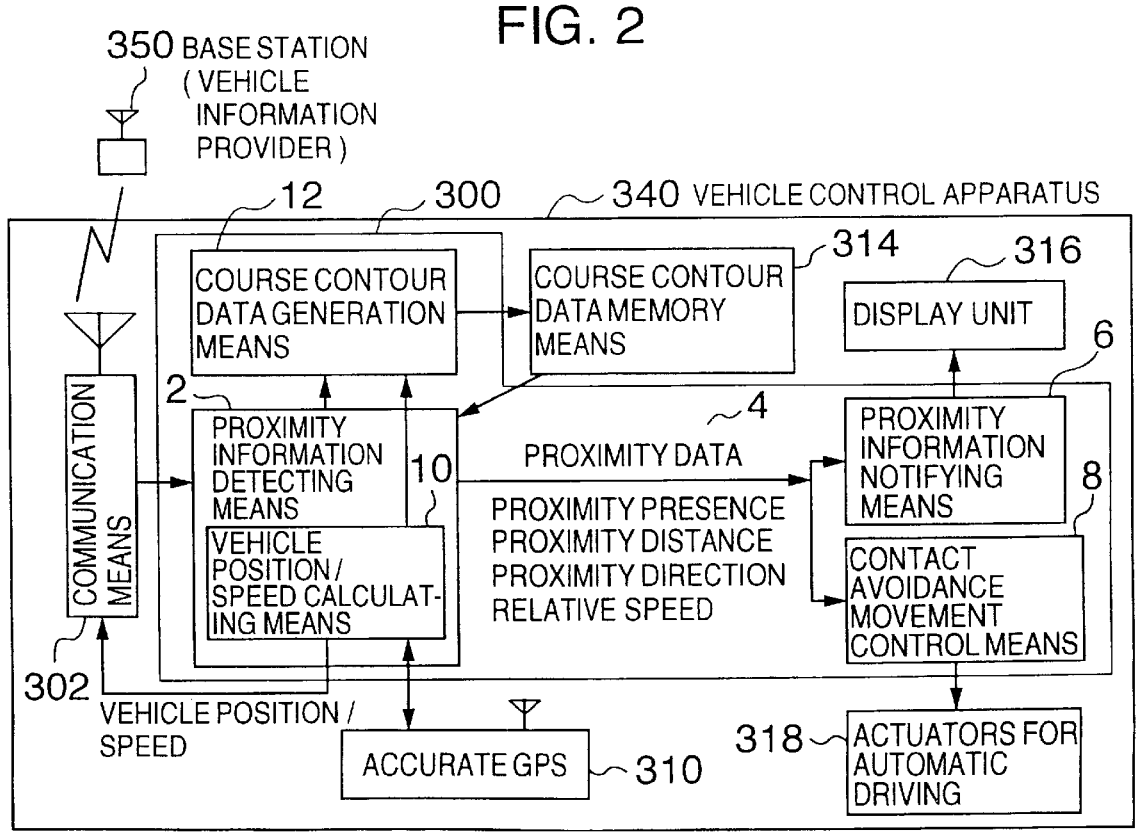

IMAGE OF AUTOMATIC DRIVING SYSTEM BASED ON KINEMATIC GPS

FIG. 18
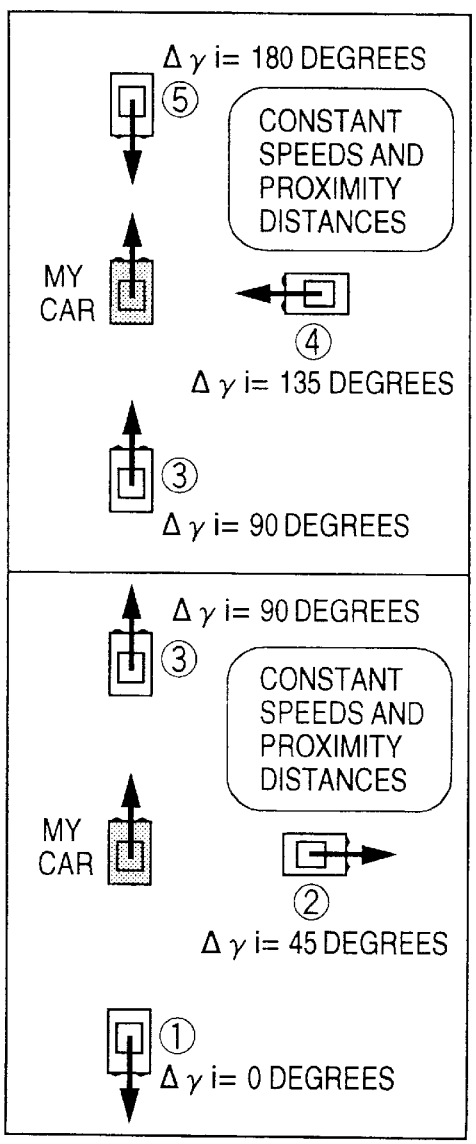
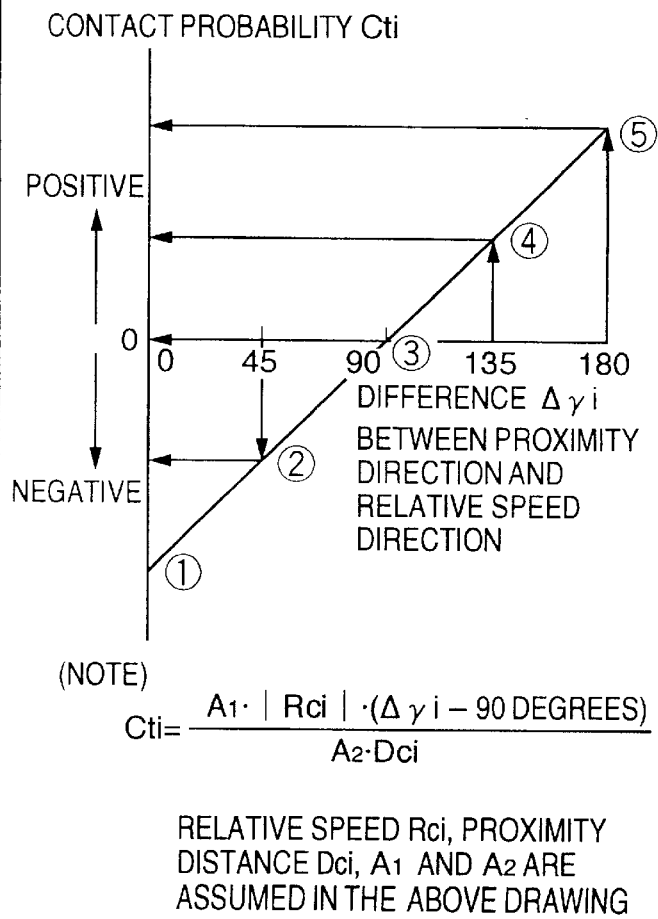

VEHICLE CONTROL SYSTEM, VEHICLE MOUNTING APPARATUS, BASE STATION APPARATUS AND VEHICLE CONTROL METHOD

BACKGROUND OF THE INVENTION

The present invention relates to a vehicle control system, vehicle mounting apparatus, base station apparatus and vehicle control method, which can manage and control movement states of vehicles by collecting information about the vehicles or fixed vehicles through communication units and transmitting information processed or added at the base station further to the vehicles.

In a road traffic field, for the purpose of improving safety, efficiency, and environment; the road infrastructure has been upgraded and intelligence has been placed on cars to realize intelligent traffic. With regard to car automatic driving as its ultimate target, most conventional cars have been based on an autonomous system closed within the cars. Such intelligent car techniques include, for example, a technique by which magnetic nails buried in a road are detected by a magnetic sensor installed in a car to track the running lane following the magnetic nails and also to control the car in such a manner that the car is kept as spaced by a constant distance from cars running in front of and in back of the car under control of a laser radar or radio wave radar, and also include a technique by which lane markers are detected by a camera mounted on a car to realize its automatic driving, as disclosed in Technical Report of IEICE (The Institute of Electronics, Information and Communication Engineers of Japan), entitled "Placing Intelligence on Road Traffic", SANE96-49.

Meanwhile, car navigation systems have been rapidly spread these years and traffic congestion information has been broadcast from communication means such as FM multiplexing or various sorts of beacons. This is expected as a means for improving the efficiency of road traffic. Further, due to use of such an inexpensive sensor as a GPS or vibration gyro scope or due to a map matching technique of matching a current position with electronized map data, the prices of the car navigation systems have drop to such a level that the navigation systems can be widely used and spread, with a location accuracy as high (about 10 to 30 m) as substantially no erroneous road recognition.

However, the above auto-driving techniques involve enormous costs in the infrastructure upgrading by using magnetic nails and in maintenance thereof, which makes it highly difficult to maintain and improve nationwide roads. In addition, the in-car mounted camera method also causes other problems on the car side, that the car become costly, requires high processing performance and high reliability.

Further, the car navigation system has been successful in its costs with a positonal accuracy range of about 10 to 30 m as mentioned above, but it is practically impossible to realize the above car automatic driving with such levels of accracies. One of major causes of the low accuracies is due to the accuracy of a global positioning system (GPS). The GPS is said to have a positional error of 30 to 100 m in a point positioning manner currently used in the car navigation, this accuracy is increased to the above level by using another sensor or correcting or interpolating it through map matching. When a differential GPS (D-GPS) of transmitting GPS error correction information through communication means, which recently starts its service, is employed, the accuracy becomes about 1 to 10 m. Even this accuracy seems insufficient as an accuracy for the automatic driving. In the recent survey and position measuring fields, the GPS using the carrier phase differential GPS principle has been remarkably advanced and accuracies of 10 cm or less have been realized (real-time kinematic (RTK) position measurement system). These accuracies are satisfactory as automatic driving accuracies but its apparatus become expensive, thus hindering the apparatus from being practically implemented in cars. For details of these accurate GPSs, refer to a book entitled "basis of GPS measurement", written by Tsuchiya and Tuji, Nippon Sokuryou Kyoukai (1995).

Another of the causes of low accuracies other than sensor is that road map data is insufficient in accuracy. That is, most existing road data are network data based on node links, in which consideration is not paid to road width and detailed shape. There recently exists a detail map considering the above road width and detailed shape when it is limited in areas, but it has a problem that it involves enormous costs in data creation and maintenance.

SUMMARY OF THE INVENTION

In view of the above problems in the prior art, it is an object of the present invention to provide a vehicle control system, vehicle mounting apparatus, base station apparatus and vehicle control method, which can realize automatic driving of a vehicle under control of a base station with a high accuracy of the order of cm, low costs and a high reliability.

The above object is attained by providing a vehicle control system which comprises a group of vehicles each having own position detecting means, information receiving means and information transmitting means; and a base station having information receiving means for receiving first information relating to the group of respective vehicles and also having information transmitting means for transmitting second information relating to selected other ones of the group of vehicles to specific one of the group of vehicles.

The above object is attained also by providing a vehicle control system which comprises a group of vehicles each having own position detecting means, information receiving means and information transmitting means for transmitting information including at least the own position; and a base station having information receiving means for receiving first information from the group of respective vehicles and also having information transmitting means for transmitting second information including position information of the vehicles; and wherein the vehicle has danger detection means for detecting its own danger on the basis of the received second information.

The above object is attained further by providing a vehicle mounting apparatus which comprises information transmitting means for externally transmitting first information including its own position; and information receiving means for externally receiving second information relating to the other vehicles, and wherein the other vehicles are located close to the own vehicle.

The above object is also attained by providing a vehicle mounting apparatus which comprises own position detecting means; information transmitting means for externally transmitting first information including its own position; information receiving means for externally receiving second information relating to other vehicles; and danger detection means for detecting its own danger on the basis of its own position and the received second information.

The above object is attained also by providing a base station apparatus which comprises information receiving means for receiving first information relating to vehicles from a group of vehicles; and information transmitting means for transmitting second information relating to selected other ones of the group of vehicles to specific one of the group of vehicles; and wherein the other vehicles are located in proximity to the specific vehicle.

The above object is also attained by providing a vehicle control method which comprises the steps of: receiving first information including own positions of a group of vehicles therefrom; and transmitting second information relating to selected other ones of the group of vehicles to specific one of the group of vehicles.

The above object is attained also by providing a vehicle control method which comprises the steps of: receiving first information including at least own positions of a group of vehicles therefrom; and transmitting second information including at least positions of the group of vehicles to the group of vehicle objects; and wherein the vehicle detects its own danger on the basis of its own position and the received second information.

The above object is attained further by providing a vehicle which comprises accurate own position detection means for detecting its own position in a satellite position measurement system based on relative measurement with a reference station as a reference; memory means for storing road map data; and correction means for correcting the road map data on the basis of the own position.

The above object is also attained by providing a vehicle which comprises accurate self position detection means for detecting its own position in a satellite position measurement system based on relative measurement with a reference station as a reference; memory means for storing road map data; a proximity detection sensor for detecting a distance to a vehicle or a relative speed thereof; and notifying/avoiding means for detecting its own danger and informing or avoiding it on the basis of at least one of the own position, the road map data, the distance or the relative speed.

BRIEF DESCRIPTION OF THE DRAWINGS

FIG. 1 shows an arrangement of a vehicle control apparatus in accordance with a first embodiment of the present invention;

FIG. 2 shows an arrangement of a vehicle control apparatus in accordance with a second embodiment of the present invention;

FIG. 18 is a diagram for explaining how to calculate contact probability of a step 186.

DESCRIPTION OF THE PREFERRED EMBODIMENTS

A vehicle control system, vehicle control apparatus and vehicle information provider in accordance with the present invention will be explained in connection with their embodiments with reference to the accompanying drawings. It is assumed in the explanation of the embodiments that the vehicle control system, vehicle control apparatus and vehicle information provider are intended to be used for such a vehicle unit as an automobile or car moving over the ground or on roads as an example.

Figure 7:
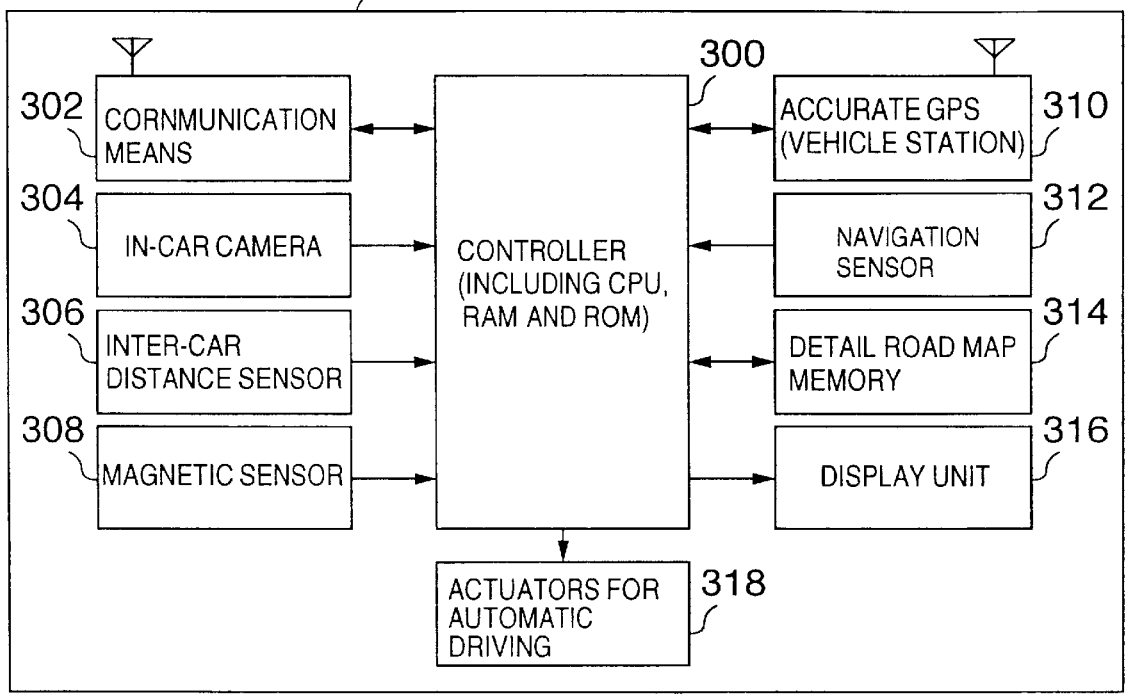
FIG. 7 shows a hardware configuration of the vehicle control apparatus of the present invention.

A first embodiment of the vehicle control apparatus to which the present invention is applied is an automobile running control apparatus an example of which is shown by a hardware configuration in FIG. 7. The apparatus of FIG. 7 includes a group of sensors (304, 306, 308, 310, 312) for detecting such information necessary for running control of the car as information on vehicle units or stationary objects, road information, etc. in the vicinity of the automobile or for detecting my car positional information; a communication unit 302 such as a transceiver for sending the above information from a base station or sending my car positional information thereto; a detailed road map memory 314 for storing therein or reading out therefrom road data having a detail degree or accuracy enough to perform automatic driving, a display unit 316 for displaying thereon a running status or control status; various sorts of actuators 318 for actuating a steering wheel, throttles and braking units for the automatic driving; and a controller 300 implemented by, e.g., a microcomputer (including CPU, RAM and ROM) for integrally controlling these units and devices.

The group of sensors include an in-car camera 304 for capturing an image in front of the car, an inter-car distance sensor 306 such as a radio wave radar for detecting a distance between my car and a car running in front of my car, a magnetic sensor 308 for detecting magnetic nails buried in roads therealong for tracking of its running lane, an accurate GPS (vehicle station) 310 for precisely detecting the position of my car, and navigation sensors 312 including a gyroscope, a terrestrial magnetism for use in another navigation apparatus, and a car speed sensor for detecting a car speed based on wheel rotation.

The accurate GPS 310 will be now explained in detail. As earlier mentioned, accurate GPSs are roughly classified into two types according to the position measuring system. One of the types is a D-DPS (differential GPS) system in which error correction information on a GPS (which will be started its service in these years) is transmitted by communication means and a positional error is about between 1 and 10 m (point positioning position: 30 to 100 m). The other type is a real-time kinematic position measuring system (also called the RTK-GPS) on which much attention is recently focused in land surveying and position measuring fields, and in which an accuracy of 10 cm or less can be realized on a real time basis (delay: about 100 ms).

The D-GPS, which is lack in its accuracy as a sensor of automatic driving application, may be of a combination configuration with another type of sensor (such as a gyroscope or a car speed sensor). The latter RTK-GPS has a problem that its costs is considerably high, though its accuracy is satisfactory only with use of its single sensor. However, it is expected with high probability that the costs of RTK-GPS will dramatically drop in near future, and thus it has a sufficient feasibility of being usable as a single sensor of the automatic driving application.

These two accurate GPSs are both based on a relative positioning system which requires a position correcting information as a reference at a base station, that is, essentially requires a communication means with the base station. In such a vehicle control system as the present invention, since communication between the vehicle unit and base station is originally intended, this position measuring system can be easily applied.

Figure 10:
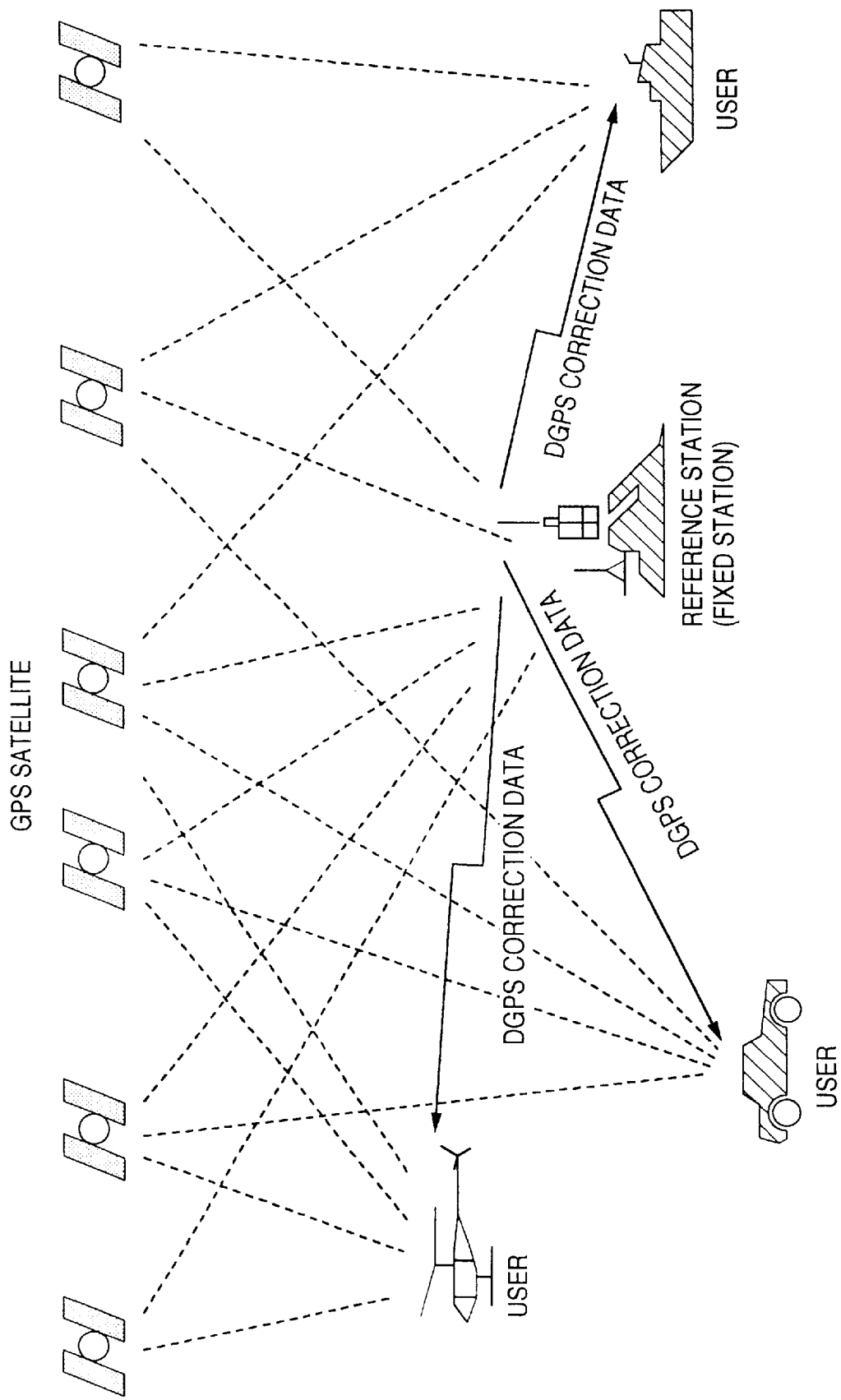
FIG. 10 is a schematic diagram for explaining the concept of operation of a D-GPS.
Figure 11:
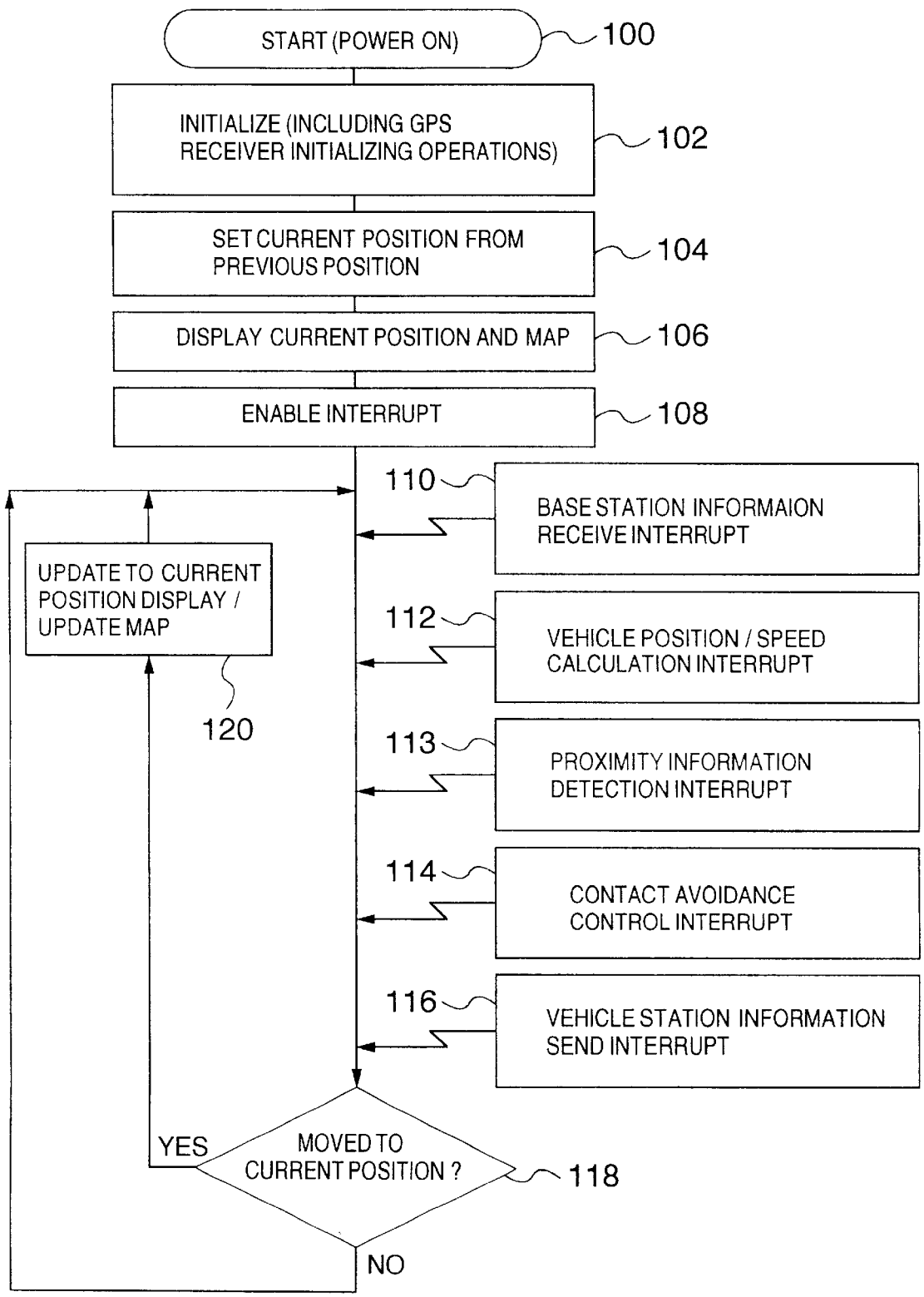
FIG. 11 is a general flowchart of the vehicle control apparatus of the present invention.

Explanation will first be made as to the principles of the both systems. FIG. 10 shows a conceptional configuration of the D-GPS. A GPS reference station receiver is installed at a known fixed position, and a difference between a distance to each satellite found from a position actually measured by the GPS and a calculation distance found from a satellite position based on the orbit data of each satellite and a known fixed position, is broadcast as pseudo range correction data. A user station finds its position by adding the value of the correction data to the pseudo range from each satellite for correction. According to this method, errors resulting from the satellites, that is, a satellite clock error, an orbit data error and an error based on selective availability (SA) can be eliminated. In addition, problems with transmission paths, an ionosphere delay error and a troposphere delay error can be lightened or reduced in such a effective range that the user station is positioned not so far from the base station.

The RTK-GPS also has substantially the same main constituent elements as those of the D-GPS. That is, the RTK-GPS has a known stationary reference station, data links and user devices. In FIG. 10, the reference station transmits data on carrier phase. A receiver of the reference station installed at the known fixed point measures carrier phases from 4 or more satellites and transmits its data to the user. At the same time, a receiver of the user station also measures carrier phases from the same satellites, and compares the measured phases with phase data received from the reference station to thereby find a user's 3-dimensional position. Since resolutions of the measured values of the carrier phases received from the GPS satellites are about $\frac{1}{10}$ of a wavelength of 19 cm of an L1 band, a relative position can be determined with a high accuracy of the order of several cm.

Figure 9:
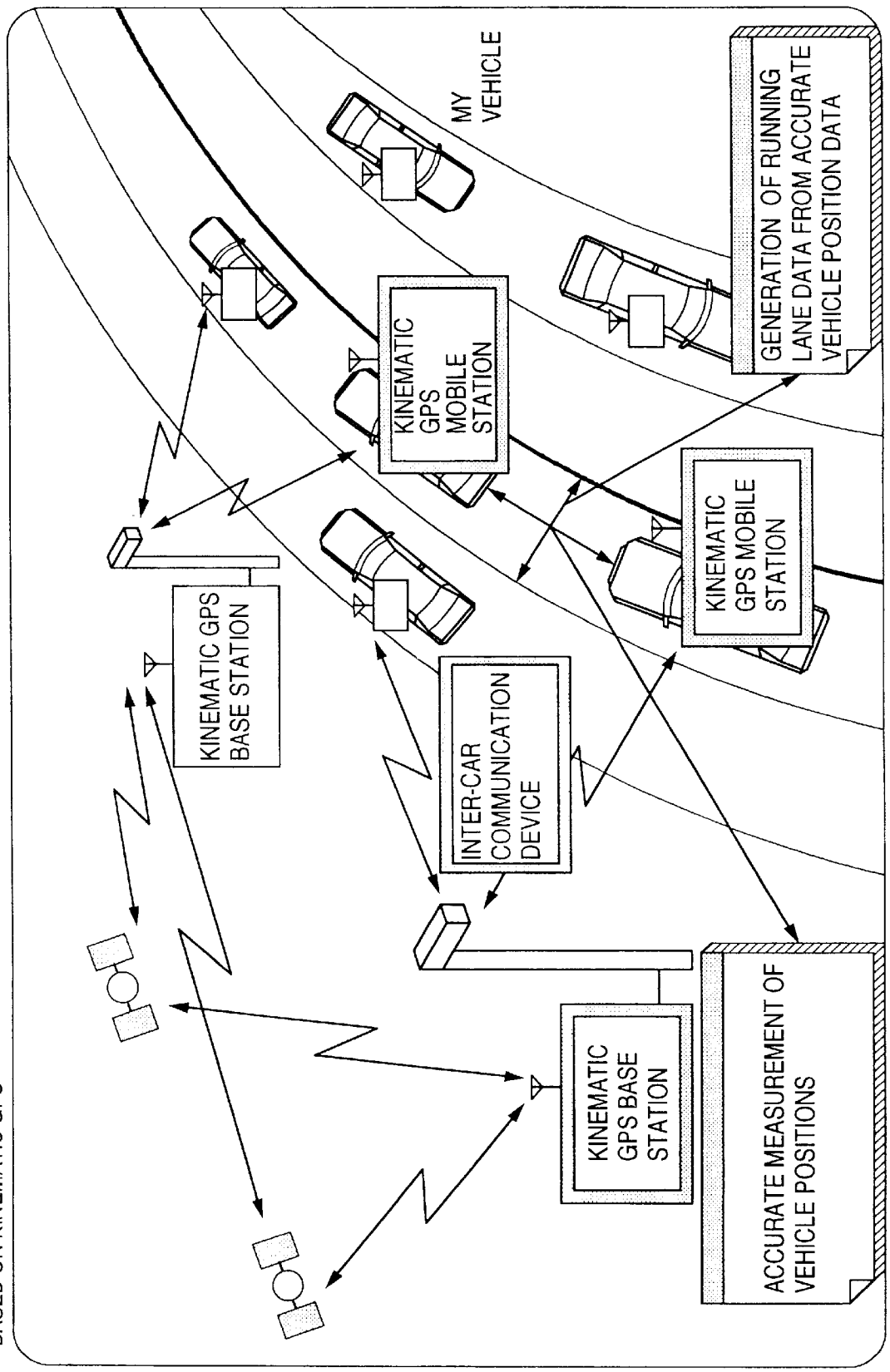
FIG. 9 is an imaginary or image illustration of an automatic driving system based on a kinematic GPS.

FIG. 9 is an imaginary illustration of an automatic driving system of the RTK-GPS type to which the present invention is applied. A vehicle station of the RTK-GPS is mounted on each automobile or vehicle, and base stations are installed along a road at intervals of about 10 km as on-road infrastructures. Each vehicle, when receiving radio waves from GPS satellites and radio wave from the base station, can perform its position measuring operation based on the RTK-GPS and can detect the position of the user car with an accuracy of the order of cm. The detected car position is transmitted by the same transceiver to the base station, collected and processed therein, and then transmitted to other cars running in the vicinity of my car as information on vicinity cars (proximity cars). In this manner, respective cars can know mutual positional relationships and thus can be controlled in such a manner as to avoid any car collision. In addition, the automatic driving system is required for the car to run so as not to come out of the traffic lane. To this end, a white line, edge stone, etc. (course contour objects) which define a running traffic lane are regarded as the aforementioned proximity objects, information on the contour objects are sent to the base station together with the vicinity car information, whereby my car can keep the running lane with the same logic. This requires creation of detail map data on traffic lanes. However, this can be realized by running cars having the RTK-GPSs carried therein for the respective lanes and easily getting road data from the position-measured results.

Further, an implementation example which follows is considered. That is, in this system, collision avoidance with a car running in front of my car or in back thereof is realized with use of such an inter-car distance sensor as a radio radar, and the RTK-GPS is used only for control of the lateral direction of my car based on the detail road data previously carried in my car, i.e., only for the aforementioned running lane keeping. For this reason, the present system only requires downloading of reference station data necessary for performing RTK position measuring operation, with the result of a remarkably reduced communication load; although the foregoing system disadvantageously involves a large mutual communication load through the base station.

Shown in FIG. 1 is a car running control apparatus in accordance with a first embodiment of the vehicle control apparatus to which the present invention is applied. An illustrated vehicle control apparatus 340, which is installed in a car, includes a communication means 302 for communicating with a base station 350 outside the car, a proximity information detecting means 2 for receiving information from the communication means 302 to know proximity data 4 including at least one of the presence, proximity distance, proximity direction and relative speed of an object in the proximity to the car; and at least one of a proximity information notifying means 6 for informing a driver of the car of the proximity data obtained from the proximity information detecting means 2 or a contact avoidance movement control means 8 for control of the running condition of the car to avoid any contact with the proximity object on the basis of the proximity data.

In this case, the proximity information notifying means 6 informs the car driver of the proximity data by means of a display unit 316, sound or vibration, whereby the driver can avoid any contact with the proximity object. The contact avoidance movement control means 8, which is made up of various sorts of actuators 318 for automatic driving, can control the car running operation without any intervention of the driver to automatically avoid an contact.

FIG. 2 shows a second embodiment of the vehicle control apparatus to which the present invention is applied. In this case, the information obtained from the communication means 302 include at least information on the position or speed of the proximity object and measurement information (e.g., a distance to an artificial satellite or range information in the case of position measurement system based on electromagnetic wave from the artificial satellite) as relative position measurement reference at a reference position (whose true information is previously known) controlled by the base station. The proximity information detecting means 2 has a vehicle position/speed calculating means 10 for calculating information on the position or speed of the vehicle object on the basis of the measurement information at the reference position. The communication means 302 has a function of transmitting to the base station at least one of the proximity data including the vehicle object position or speed information received from the vehicle position/speed calcuating means 10 and also including information obtained by other means carried in the vehicle object.

The above relative position measurement may be carried out by such an accurate differential GPS(D-GPS) 310 that is a satellite position measurement system based on code information modulated on receive electromagnetic wave received from a GPS satellite and that has the vehicle position/speed calcuating means 10.

The above relative position measurement also may be carried out by such an accurate RTK-GPS 310 that is a satellite position measurement system based on wave number and phase of carrier of receive wave received from the GPS satellite and that has the vehicle position/speed calcuating means 10.

The above relative position measurement also may be carried out by a similar means, by a GLONASS as a satellite position measurement system similar to the GPS controlled by the Soviet Union, or by a combination of the GPS and GLONASS.

Figure 3:
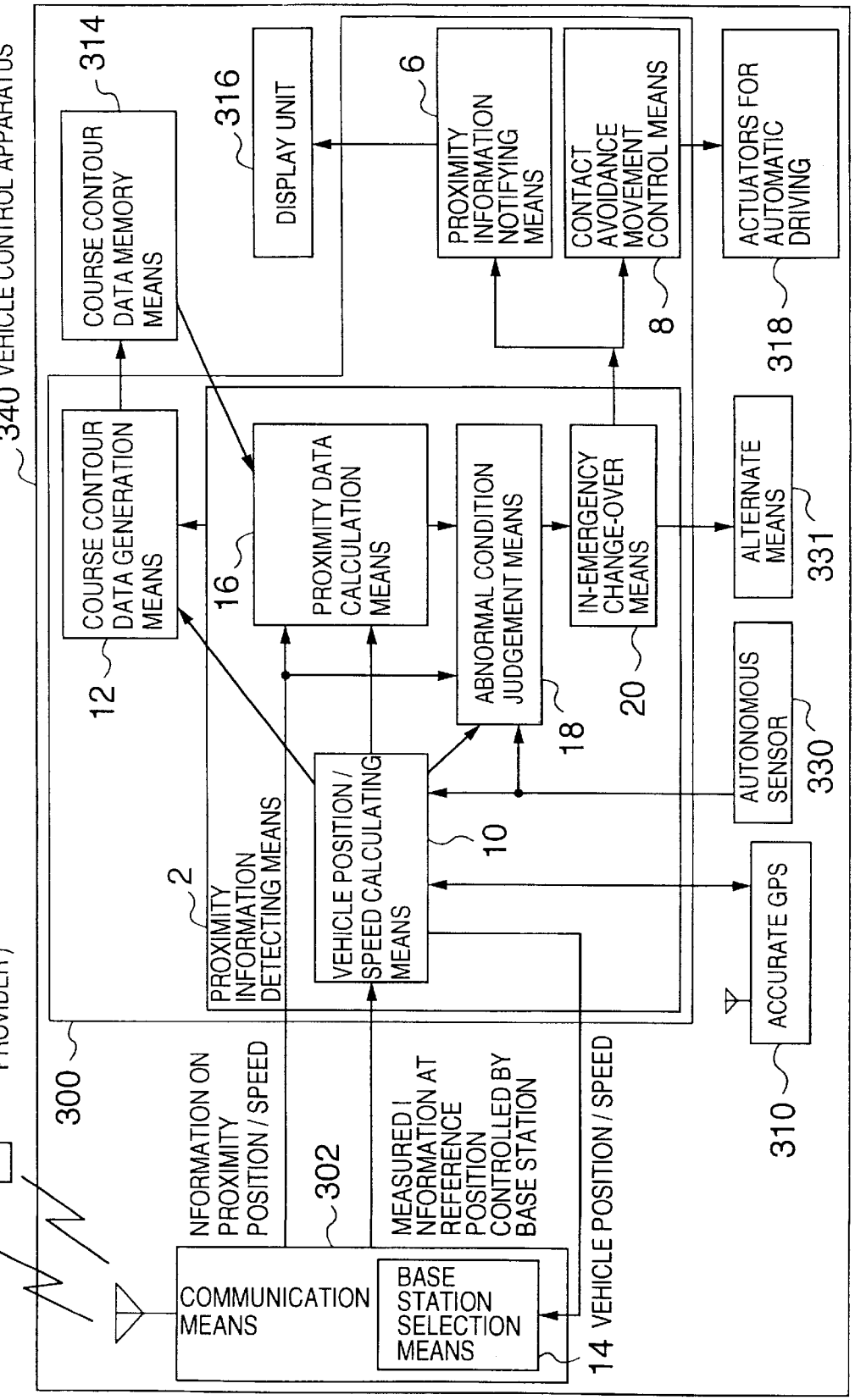
FIG. 3 shows an arrangement of a vehicle control apparatus in accordance with a third embodiment of the present invention.

FIG. 3 shows a third embodiment of the vehicle control apparatus to which the present invention is applied. In this case, the proximity information detecting means 2 includes a proximity data calculation means 16 for calculating the proximity data 4 on the basis of a difference between the position or speed information of the vehicle object received from the vehicle position/speed calcuating means 10 and the position or speed information of the proximity object received from the communication means 302. In this connection, accurater contact judgement can be realized when the proximity data calculation means 16, taking the sizes of the proximity and vehicle objects, calculates the proximity data 4 between the nearest portions of the both objects.

The proximity information detecting means 2 also includes an abnormal condition judgement means 18 for receiving a signal from the communication means 302, an output from the vehicle position/speed calcuating means 10, information from an autonomous sensor 330 installed in the vehicle object, and at least one or more of outputs from the proximity data calculation means 16. Also included in the proximity information detecting means 2 is an in-emergency change-over means 20 for switching to another alternate means 331 only when the abnormal condition judgement means 18 determines an abnormality. Thus a system having a high safety can be implemented. In this connection, the alternate means 331 may be one of various sensors including the in-car camera 304 and inter-car distance sensor 306 such as a radio wave radar, which is normal as shown in FIG. 7. In such worst case that there is no alternate normal means to be switched, the proximity information detecting means 2 is only required to cut off the signal in such a manner that the contact avoidance movement control means 8 will not be executed based on the abnormal data.

The communication means 302, which has a function of receiving a plurality of electromagnetic waves radiated from a plurality of base stations located at different places as shown in FIG. 3, may has a base station selection means 14 for selecting one of information pieces of the plurality of base stations to be used on the basis of at least the vehicle position information received from the vehicle position/speed calcuating means 10. More specifically, the base station selection means 14, for example, calculates distances from the vehicle position to the respective base stations and selects one of the base stations corresponding to shortest one of the calculated distances. This selection may be effected by taking not only the distance but also the advancing direction of the vehicle object into consideration and preferentially selecting one of the base stations which is located nearly toward the advancing direction even if its distance is relatively far.

The vehicle position/speed calcuating means 10 is arranged, taking into account the information relating to the autonomous sensor installed in the vehicle object such as a gyroscope or terrestrial magnetism sensor for use in a navigation apparatus, the navigation sensors 312 including a car speed sensor for detecting a car speed based on wheel rotation, the in-car camera 304, or the inter-car distance sensor 306 including a radio wave radar.

As shown in FIG. 2 or 3, a course contour data generation means 12 is provided for generating course contour data indicative of the shape of a course contour, i.e., a vehicle movable range, or in the case of a car, detail road map data including lane information. In the data generation, the vehicle movable range can be roughly determined by taking a certain level of allowance, e.g., in the car width direction relative to my car position or proximity position accurately detected by the above means. The generated data may be stored in such a course contour data memory means 314 provided in the vehicle object as a large capacity of semiconductor memory, a hard disk or DVD-RAM, and the proximity information detecting means 2 may be executed on the stored road map data.

Further, when the proximity data 4 obtained from the proximity information detecting means 2 are of a plurality of proximity objects, the contact avoidance movement control means 8 preferably evaluates contact probabilities with the plurality of proximity objects on the basis of the proximity data and averages the contact probabilities for safer control. For example, when a car in front of my car abruptly decelerates during running of my car, on the contact probability of the front car will abruptly increase. In order to minimize the increased contact probability as much as possible, it is more preferable as a whole to provide such decelerating operation for safer control even that would increase the contact probability of the rear car.

Meanwhile, when consideration is paid even to the course contour indicative of the vehicle movable range, i.e., even to the white line or edge stone of a road in the case of a car, it is preferable to operate the contact avoidance movement control means 8 in such a manner as to preferentially lower the contact probabilities of objects other than the course contour for safer control.

In addition, the course contour data may be arranged so as to be supplied from the course contour data memory means 314 installed in the vehicle object, e.g., from a large capacity of semiconductor memory, a hard disk or DVD-RAM.

Figure 4:
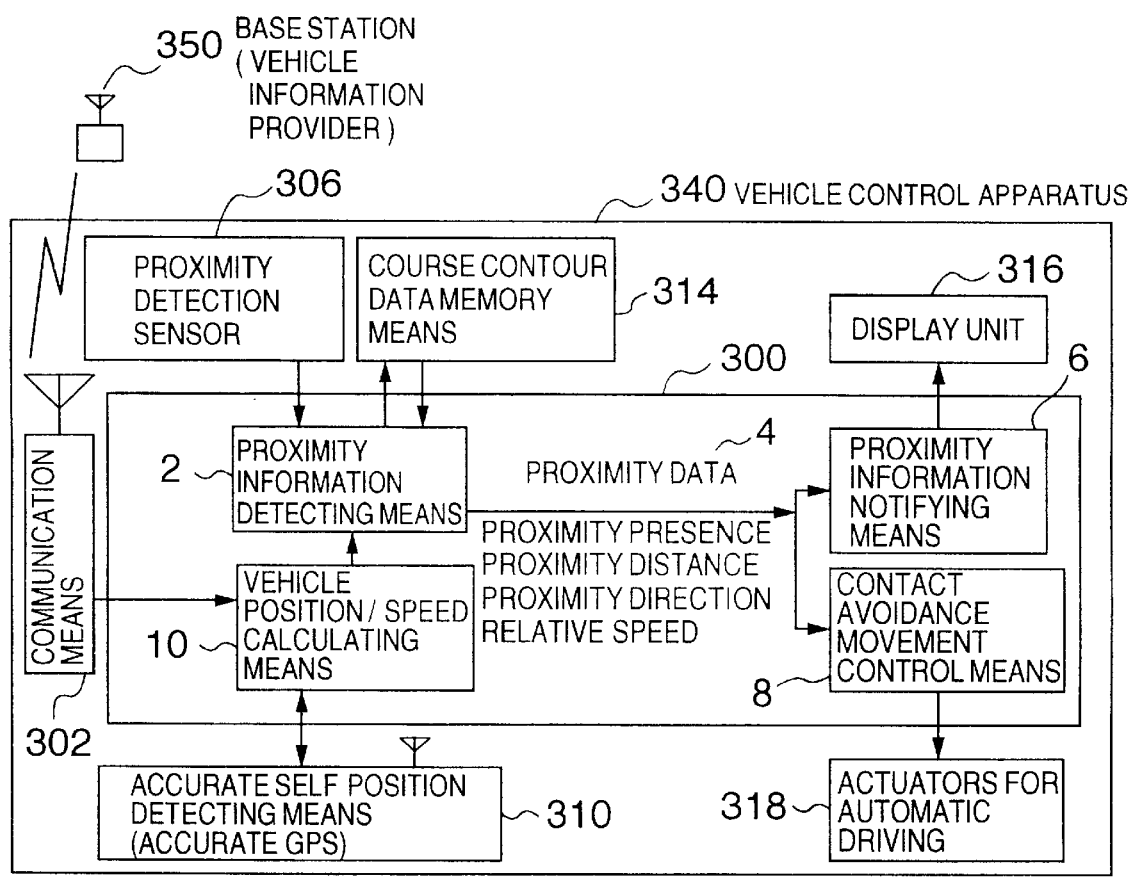
FIG. 4 shows an arrangement of a vehicle control apparatus in accordance with a fourth embodiment of the present invention.

A fourth embodiment of the vehicle control apparatus to which the present invention is applied is intended also as a car running control apparatus. The apparatus has a hardware configuration of FIG. 7 similar to the foregoing case and has such an arrangement as shown in FIG. 4. The illustrated apparatus includes a communication means 302 installed in a car for information communication with a base station 350 provided outside the car. Information obtained from the communication means 302 is measurement information (e.g., information regarding a distance to a satellite, i.e., range information in the case of the position measurement system based on electromagnetic wave from an artificial satellite) as relative position measurement reference of a reference position (whose true information is previously clearly known) controlled by the base station. Also included in the apparatus are a vehicle position/speed calcuating means 10 for calculating information on the position or speed of the vehicle object on the basis of the measurement information at the reference position as well as a course contour data memory means 314 for storing course contour data indicative of the shape of a course contour or the vehicle movable range, i.e., in the case of a car, detail road map data including lane information relating to road white line or edge store or traffic restriction or control information. Additionally included in the apparatus is a proximity information detecting means 2 for receiving a positonal or speed output from the vehicle position/speed calcuating means 10 and a course contour data output from the course contour data memory means 314 and for calculating proximity data 4 including at least one of the course contours, i.e., a proximity distance to the lane and a relative speed. Further included in the apparatus is at least one of a proximity information notifying means 6 for informing the driver of the vehicle object of the proximity data 4 received from the proximity information detecting means 2 and a contact avoidance movement control means 8 for controlling the moving condition of the vehicle object in such a manner as to avoid any contact with the proximity object on the basis of the proximity data.

The proximity information notifying means 6 informs the car driver of the proximity data with use of a display unit 316 or the like, whereby the driver can avoid any contact with the proximity object. The contact avoidance movement control means 8 can control various sorts of actuators 318 for automatic driving to automatically avoid any contact without any intervention of the driver.

The relative position measurement, similarly to the above case, may be carried out by a differential GPS (D-GPS) as a satellite position measurement system for measuring code information superimposed on a receive electromagnetic wave from an artificial satellite or the wave number or phase of carrier in the receive electromagnetic wave, or by such an accurate self position detection means (accurate GPS) 310 as to have the vehicle position/speed calcuating means 10 of the D-GPS or RTK-GPS type. In this connection, the "accurate" refers to having an accuracy of about 10 m or less corresponding to a position measurement accuracy of the D-GPS or RTK-GPS as mentioned above.

The proximity information detecting means 2 has a function of detecting the proximity state of the running lane in its direction perpendicular to the car advancing direction. Further included in the apparatus is a proximity detection sensor (inter-car distance sensor) 306 for detecting a distance to another vehicle in the vehicle advancing direction or in the opposite direction or a relative speed.

By taking a certain level of allowance of, e.g., car width direction relative to my car position or proximity position accurately detected, a car running rage can be roughly determined. When the map data accuracy is bad or lacking, the map data can be corrected with use of the allowance.

In the case of the car, in this way, the car can run along the running lane while accurately keeping its center. Thus this system can be remarkably reduced in costs when compared to that of such a system as to use magnetic nails buried along a road. Further, although the foregoing third embodiment has a problem that a mutual communication load between vehicles through the base station becomes large; this system is only required to download from the base station the reference station data necessary for performing the RTK position measuring operation, with the result of a remarkably reduced communication load. Contact avoidance from the front or rear car may be realized, as mentioned above, by using the in-car camera 304 or proximity detection sensor 306 such as an electromagnetic wave radar.

Figure 8:
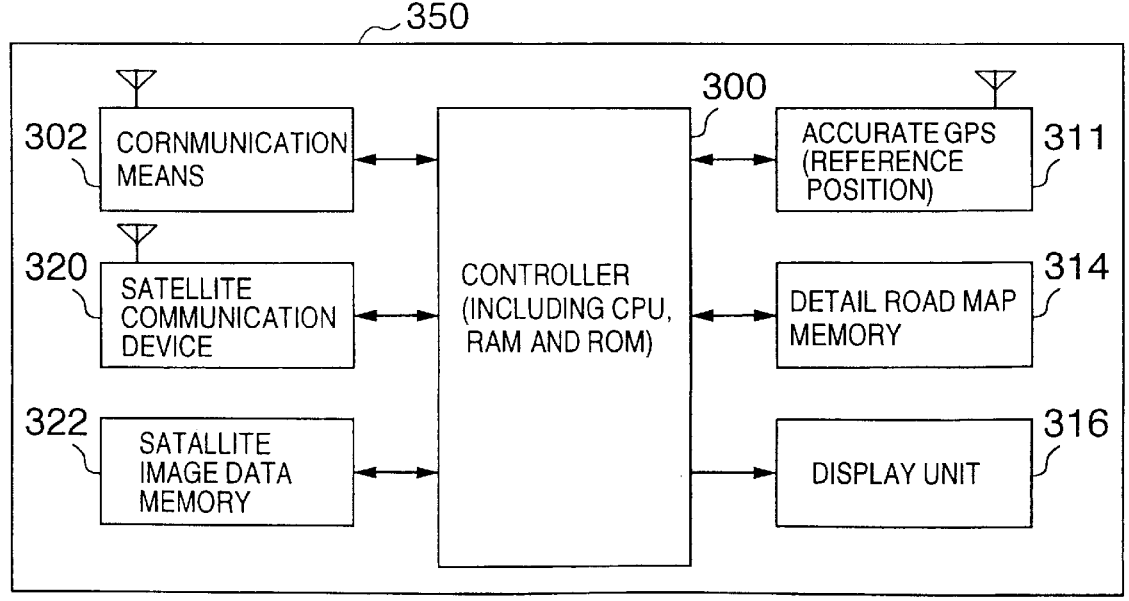
FIG. 8 shows a hardware configuration of a vehicle information provider in the present invention.

A first embodiment of the vehicle information provider to which the present invention is applied is for use in a car and has such a hardware configuration as shown, e.g., in FIG. 8. More specifically, the provider includes a communication means 302 for transfer of information to and from a vehicle, an accurate GPS 311 (reference station) for measuring reference information for accurate detection of positonal information of respective vehicles, a detail road map memory 314 for storing therein or reading out therefrom road data having an accuracy and finess necessary for allowing the respective vehicles to perform their automatic driving operation, a display unit 316 for displaying thereon the running and control statuses of the vehicles, a satellite communication device 320 for receiving satellite image data for grasping general vehicle traffic, a satellite image data memory 322 for storing the received image data, and a controller 300 for integrally controlling the above constituent components. The controller 300 may be implemented in the form of, e.g., a microcomputer (including CPU, RAM and ROM).

Figure 5:
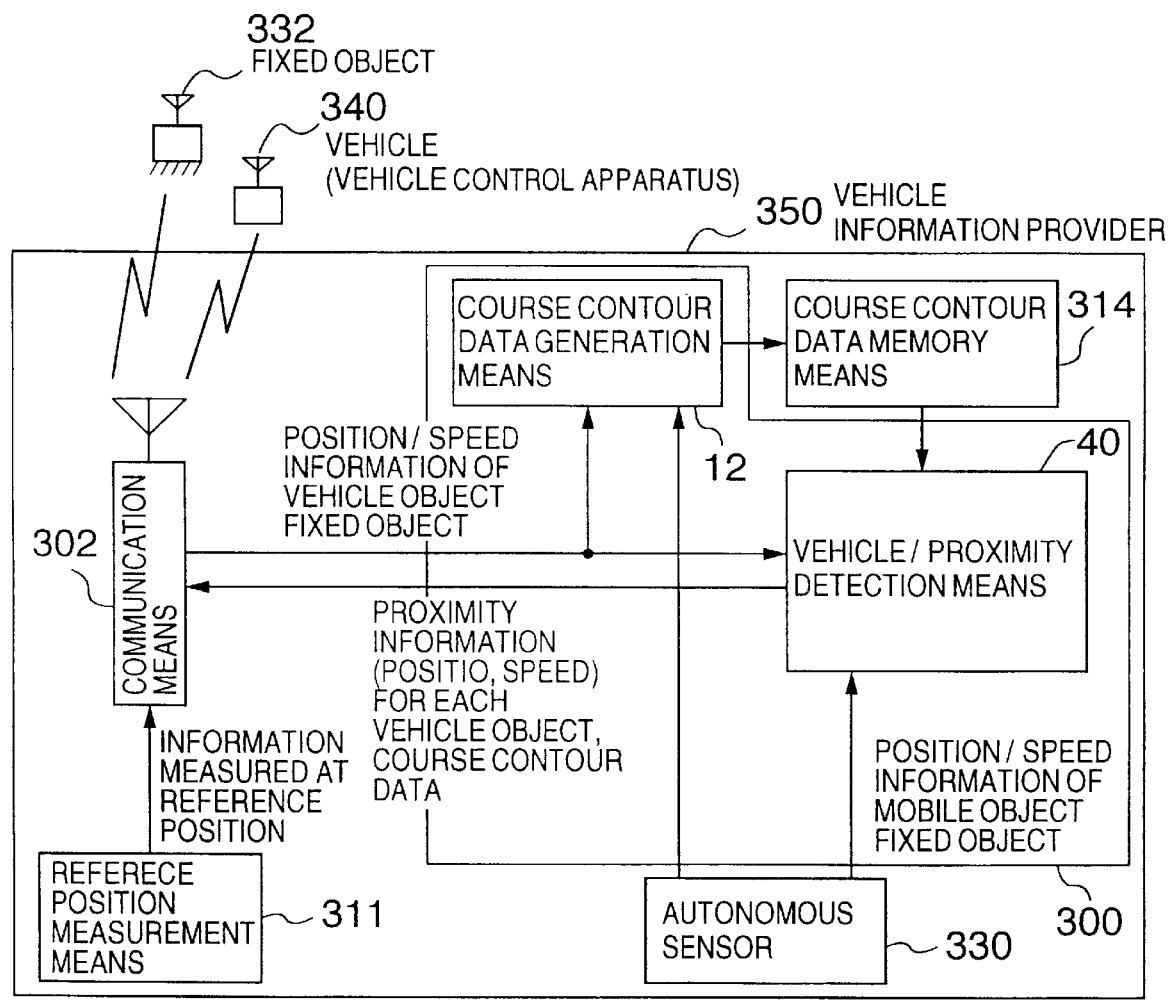
FIG. 5 shows an arrangement of a vehicle control apparatus in accordance with a fifth embodiment of the present invention.

FIG. 5 shows a functional diagram of a car information provider as the first embodiment of the vehicle information provider to which the present invention is applied. An illustrated vehicle information provider 350 includes a communication means 302 provided at a base station 350 for communication of information with the external base station, and also includes a vehicle/proximity detection means 40 for indexing a proximity object for each vehicle on the basis of at least one of information on the position or speed of the vehicle or a fixed object 332 collected by the communication means 302 and information based on an autonomous sensor 330 to prepare information relating at least to the position or speed of the indexed proximity object. The communication means 302 has a function of sending to the vehicles associated with the information relating to at least the position or speed of the proximity objects prepared by the vehicle/proximity detection means 40.

As shown in FIG. 5, the base station 350 also includes a reference position measurement means 311 for measuring reference information of the relative position measurement at a reference position, and the communication means 302 transmits to the vehicles or fixed object the measurement information of the reference position received from the reference position measurement means 311.

In this connection, the relative position measurement may be carried out by a satellite position measurement system of measuring code information superimposed on a receive electromagnetic wave from an artificial satellite or the wave number or phase of carrier in the receive electromagnetic wave, that is, by a D-GPS or RTK-GPS.

In the illustrated example, further, the fixed object 332 refers to such an object usually not changed frequently, such as road lane information. For example, such a usually usable area, when the area is changed not to be used due to the road construction, is regarded as a fixed object. In this case, informing of the base station of the area of the road construction can be easily realized by fixedly installing a device corresponding to a vehicle station of an accurate GPS at that place.

In the proximity indexing operation of the vehicle/proximity detection means 40 on the basis of information on the positions or speeds of vehicles or fixed objects collected by the communication means 302; the contact probabilities of the proximity objects are evaluated from the positions or speeds of the vehicles or peripheral proximity objects so that ones of the proximities having contact probabilities of a threshold level or higher are regarded as proximities.

In this case, information on the proximities having the high contact probabilities are sent by the communication means 302 to vehicles which are controlled based on at least one of the smallest proximity distance between the proximity object and vehicle, proximity direction and relative speed taking the sizes of the proximity object and vehicle into consideration.

The alternate means uses at least one of the position information of vehicles or fixed objects based on two-dimensional image data on the Earth as viewed from the artificial satellite and the speed information of vehicles or fixed objects based on the two-dimensional image data changed with time.

Also included in the vehicle information provider 350 are course contour data generation means 12 for generating data of a course contour indicative of a vehicle movable range, i.e., indicative of the shape of the road on the basis of at least one of information on the positions or speeds of vehicles or fixed objects collected by the communication means 302 and information based on the alternate means, as well as a course contour data memory means 314 for storing the course contour data generated by the course contour data generation means 12.

In place of the generation means, it may be carried out by separately obtaining course contour data indicative of the road shape, previously storing the obtained course contour data in the course contour data memory means 314, executing the vehicle/proximity detection means 40 with use of the course contour data as its input, and sending the course contour data to vehicles through the communication means 302.

The first embodiment of the vehicle control system to which the present invention is applied is intended as a car control system and has such a hardware configuration as, e.g., a combination of FIGS. 7 and 8.

Figure 6:
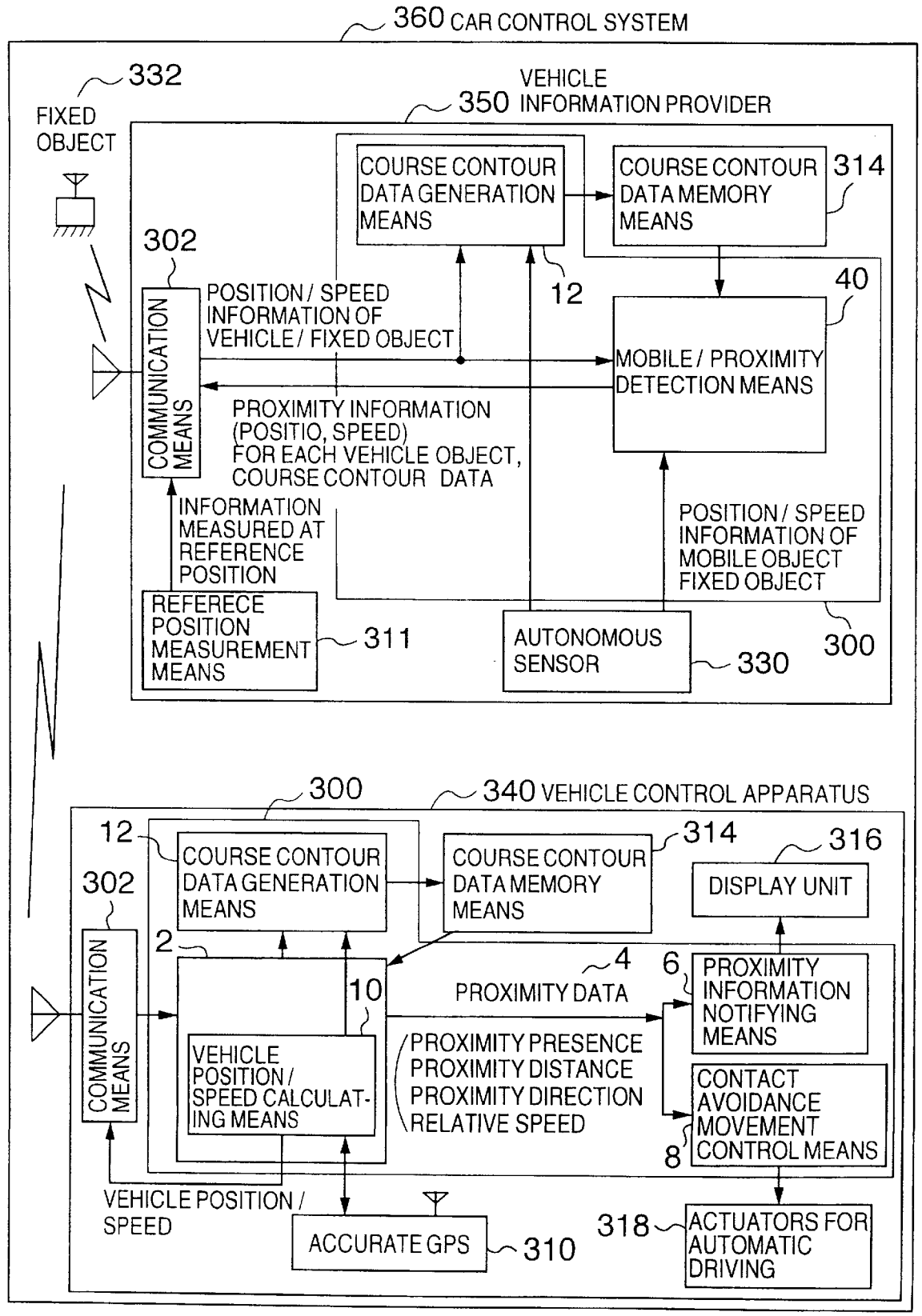
FIG. 6 shows an arrangement of a vehicle control system in accordance with an embodiment of the present invention.

Shown in FIG. 6 is an example of the car control system in accordance with the first embodiment of the vehicle control system of the present invention. An illustrated car control system 360 for collecting information on vehicles or fixed objects 332 to a base station and transmitting the information processed or added by the base station to my vehicle to control and manage the running condition of the vehicle includes a communication means 302 provided in the vehicle and base station for communicating with each other, and also includes a proximity information detecting means 2 for acquiring proximity data 4 including at least one of the presence of proximity objects, proximity distance, proximity direction and relative speed on the basis of information relating to the position or speed information of the vehicles or fixed objects 332. Further included in the car control system is either one of a proximity information notifying means 6 for informing the vehicle driver of the proximity data 4 obtained by the proximity information detecting means 2 and a contact avoidance movement control means 8 for controlling the running condition of the vehicle in such a manner as to avoid any contact with the proximity object on the basis of the proximity data 4.

In this case, the information obtained by the vehicle from the communication means 302 include at least information on the positions or speeds of proximity objects and reference measurement information of relative position measurement at a reference position controlled by the base station. The proximity information detecting means 2 has a vehicle position/speed calculating means 10 for calculating information on positions or speeds relative to the measurement information at the reference position. The communication means 302 has a function of transmitting to a base station 350 at least one of the vehicle position or speed information obtained by the vehicle position/speed calculating means 10 and the proximity data 4 also including information obtained by other means provided in the vehicles. The information obtained at the base station through the communication means 302 is at least one of the position or speed information of the vehicles or fixed objects 332 or information obtained by an alternate means 330. Also included in the vehicle information provider 350 are a vehicle/proximity detection means 40 for selecting proximity objects for each vehicle to prepare information on at least positions or speeds of the indexed proximity objects on the basis of the information obtained by the base station, as well as a reference position measurement means 311 for measuring reference information of the relative position measurement relative to the reference position controlled by the base station. The communication means 302 has a function of transmitting to the associated vehicles the at least proximity position or speed information prepared by the vehicle/proximity detection means 40. Or the communication means 302 has a function of transmitting to the respective vehicles or fixed objects 332 the measurement information of the reference position issued from the reference position measurement means 311.

The base station includes a course contour data generation means 12 for generating course contour data indicative of a vehicle movable range or the shape of the course contour on the basis of at least one of position or speed information of vehicles or fixed objects 332 collected by a communication means 302 and information based on an alternate means 330, and also includes a course contour data memory means 314 for storing the course contour data generated by the course contour data generation means 12. In this case, the vehicle/proximity detection means 40 may be carried out with the course contour data as its input, and/or the communication means 302 may transmit the course contour data to the vehicles.

The vehicle may be provided with a course contour data generation means 12 for generating the course contour data indicative of its vehicle movable range or the shape of the course contour on the basis of an output of the vehicle position/speed calculating means 10 or proximity information detecting means 2, and also with a course contour data memory means 314 for storing the course contour data generated by the course contour data generation means 12.

In this case, the relative position measurement may be carried out by a satellite position measurement system, i.e., a D-GPS or RTK-GPS which measures code information superimposed on receive electromagnetic wave from a artificial satellite or the wave number and phase of carrier in the receive electromagnetic wave.

Such a satellite position measurement system as a GPS can also measure, in addition to the position measurement, time information at an accuracy of 1 microsecond or less. In this case, the vehicle object and base station each measure time information based on the satellite position measurement system so that communication between the vehicle object and base station is carried out according to a time-division multiplex communication system on the basis of the time information measured by the vehicle object and base station. This enable easy distinction of the communication party, allowing 1:1 communication.

Explanation will next be made as to the processing procedure of the vehicle control apparatus in the present embodiment, with reference to flowcharts of FIGS. 11 to 16.

The major processing procedure of the present embodiment is repeated at intervals of a predetermined time. For example, as shown by a general flowchart in FIG. 11, a power supply of the vehicle control apparatus of the present embodiment is first turned ON (step 100), and then a predetermined initializing process (step 102) is carried out. During the initializing operation, the GPS receiver 310 is also subjected to its initializing operation.

At a step 104, a current position is automatically set with use of a position obtained at a vehicle position/speed calculation interrupt 112 in the previous process or in the absence of the previous-time position, with use of an initial position measurement result initialized by the GPS receiver 310. When the GPS receiver 310 cannot be usually initialized, it may be arranged so that a user can manually enter a current position.

At a step 106, a display processor reads out map data including the current position set at the above step from the map memory 314., and a predetermined mark indicative of the current position of the vehicle object is superimposed on a map of the map data to create image data for its display, and the image data is sent to the display unit 316.

Thereafter, at a step 108, interrupts 110, 112, 113, 114 and 116 which follow are enabled or authorized. Although the following processes have been assumed to be all interrupts in this case, ones of the processes not particularly required may be, e.g., task processes.

The base station information receive interrupt 110 is activated or used when information was received from the base station.

The vehicle position/speed calculation interrupt 112 is used for each time of a predetermined time At to measure a vehicle position from data obtained from the GPS or other sensors.

The proximity information detection interrupt 113 is used when there is proximity information in the data received from the base station, to calculate relative distances or speeds between my car and proximity objects or proximity data and to evaluate contact probabilities of the proximity objects.

The contact avoidance control interrupt 114 is used at the time of calculating the above proximity data to determine such control as to avoid any contact on the basis of the proximity data of the proximity object having the highest contact probability.

The vehicle station information send interrupt 116 is used at the time of transmitting the information obtained at the vehicle object to the base station.

At a step 118, the vehicle position estimated by the vehicle position/speed calculation interrupt 112 is compared with the vehicle position set in the previous cycle to judge whether or not the current position of the vehicle object is shifted. When a position shift is determined (Yes at the step 118), the system enters a step 120 to cause the display processor to change the display of the current position and if necessary to update the map. When no position shift is determined (No at the step 118), the operations of the step 110 and subsequent steps are repeated.

Figure 12:
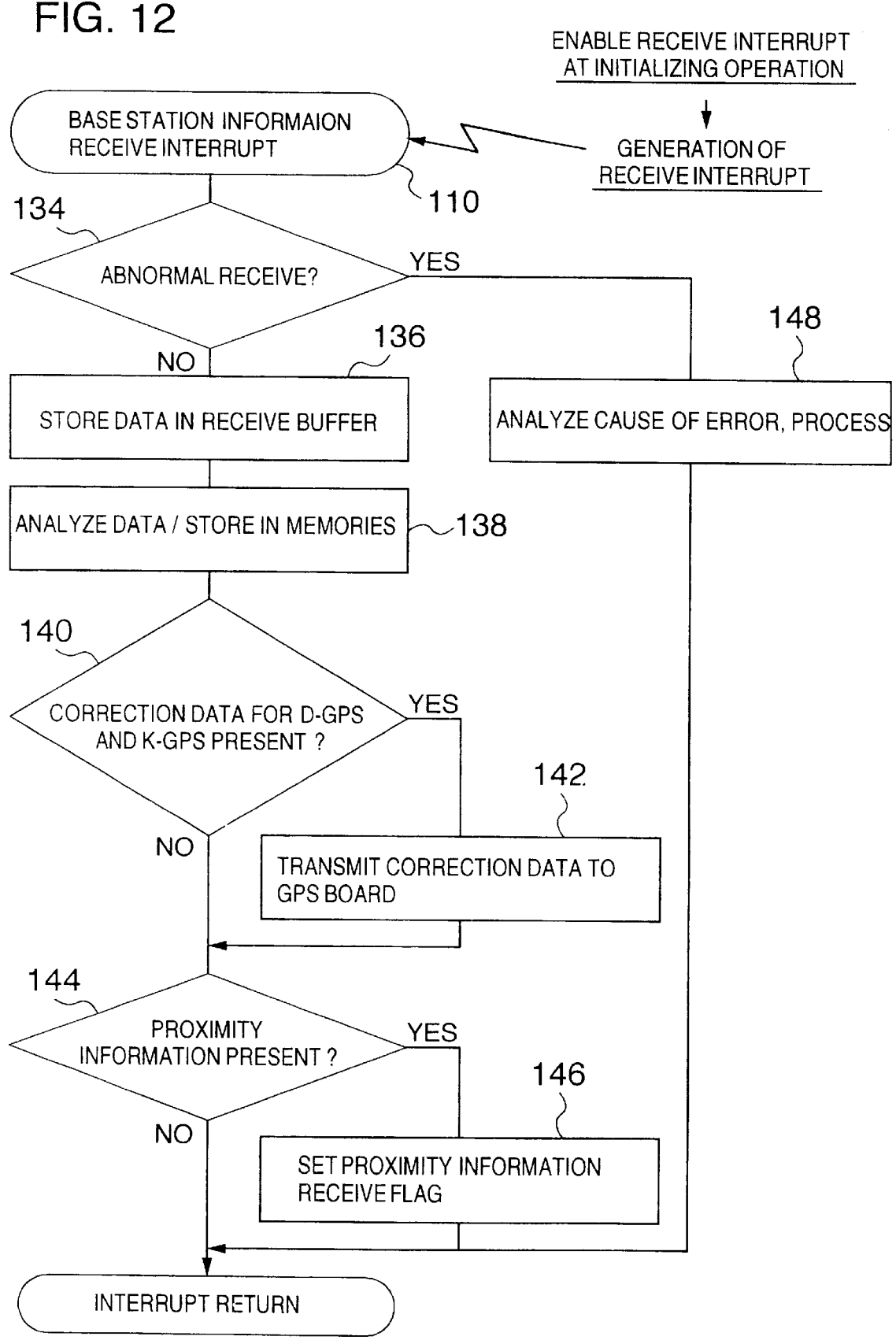
FIG. 12 is a flowchart of a base station information receipt interrupt in FIG. 11.

Next, explanation will be made in connection with FIG. 12 as to the processing procedure of the base station information receive interrupt 110 at the time of receiving information from the base station. When the receive interrupt is enabled at the interrupt enable step in the general flowchart of FIG. 11, receipt of information from the base station causes a receive interrupt to take place. At a step 134, it is judged from an error flag whether or not the receipt is abnormal. Judgement of a receipt error causes the system to analyze and process the cause of the error at a step 148. In the case of no error, the system proceeds to a step 136 to store the data in a receive buffer. Thereafter, at a step 138, the system to analyze the data and store it in memory. Subsequently, at a step 140, it is judged whether or not there is correction data for the D-GPS or K-GPS (kinematic GPS), and in the presence of such data, the system goes to a step 142 to transmit the correction data to the associated GPS boards. In the absence of such data, the system goes not to the step 142 but to a step 144 to judge whether or not there is proximity information in the receive data. The presence of the proximity information causes the system to go to a step 146 to set a proximity information receive flag. The absence of the proximity information causes the system to terminate its interrupt operation without any operation of the step 146.

Figure 13:
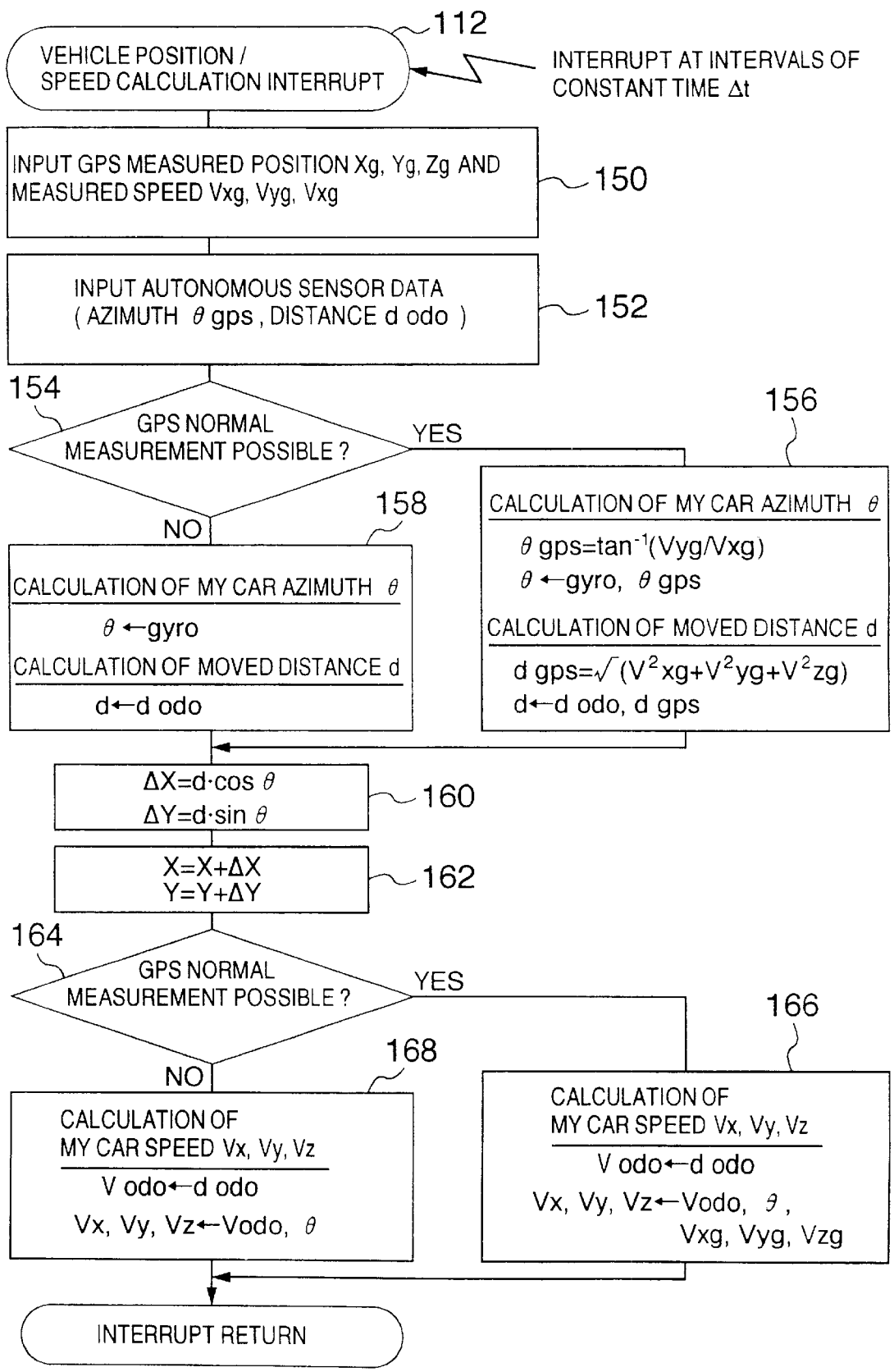
FIG. 13 is a flowchart of a vehicle position/speed calculation interrupt in FIG. 11.
Figure 14:
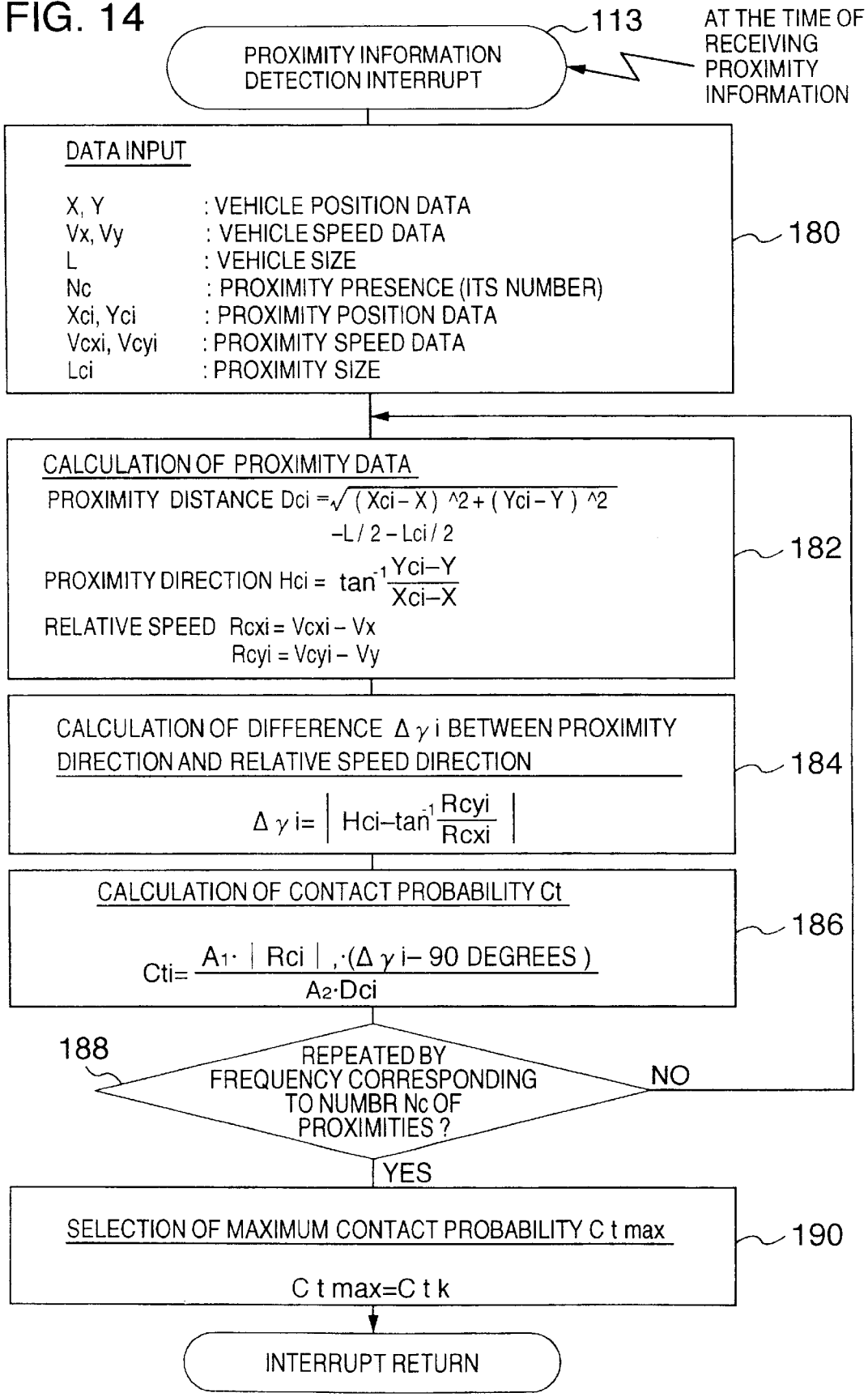
FIG. 14 is a flowchart of a proximity information detection interrupt in FIG. 11.

Explanation will then be made as to the processing procedure of the vehicle position/speed calculation interrupt 112 to be executed by the vehicle position/speed calculating means 10 at intervals of the constant time Δt, by referring to FIG. 13.

In the present procedure, first of all, at a step 150, normal measured position data Xg, Yg, Zg and speed data Vxg, Vyg, Vzg are input by the GPS. It is assumed here that, as mentioned above, the GPS is enhanced in its accuracy based on information from the base station. At a step 152, a measured azimuth $\theta_{gyro}$ and a distance $d_{odo}$ are input by a sensor autonomically mounted to the vehicle object, for example, by such a navigation sensor 312 as a gyro or distance sensor.

At a step 154, it is judged whether or not the GPS is in its normally measurable state (the number of receive satellites being 3 or more). In the case of the normally measurable state (Yes at the step 154), the system goes to a step 156 to add a measured GPS result of it and calculate a my car azimuth θ my car azimuth θ and a distance d. At this time, an azimuth $\theta_{gps}$ measured by the GPS can be calculated in accordance with an equation using horizontal direction measured speed components Vxg and Vyg at the step 156, while a movement distance $d_{gps}$ can be calculated in accordance with an equation also given in the same step. Taking the azimuth $\theta_{gps}$ and the azimuth $\theta_{gyro}$ measured by the gyro together, taking the movement distance $d_{gps}$ and the distance $d_{odo}$ measured by an autonomous distance sensor, e.g., for measuring the rotation of the wheel together, to thereby calculate an accurate my car azimuth θ and movement distance d whose errors are mutually corrected. When the number of receivable GPS satellites is less than 3 (No in the step 154), it is impossible to use the measured GPS quantities as in the step 156 and thus the system goes to a step 158 to calculate a my car azimuth θ and a movement distance d on the basis of measured quantities other than the GPS quantities.

Thereafter, at a step 160, movement distance components ΔX and ΔY on the horizontal plane of the vehicle object are calculated from the my car azimuth θ and movement distance d. At a step 162, the movement distance components ΔX and ΔY are added to current position coordinate values X and Y already found in the previous operation to find a new movement position X, Y.

With respect to the vehicle control system, similarly to the case of the above position calculation, it is judged at a step 164 whether the GPS is in its normal measurable state (3 or more receive satellites). When the GPS is in the normal measurable state (Yes at the step 164), the system, at a step 166, adds Vxg, Vyg and Vzg as GPS measured results to it to calculate a my car speed Vx, Vy, Vz. At this time, the above distance sensor uses its measured quantity distance $d_{odo}$ and finds its rate of change to find a speed value Vodo (scalar). With respect to the direction, the system can use the above my car azimuth θ. When the number of receivable GPS satellites is less than 3 (No at the step 164), the system cannot use the GPS measured quantities as in the step 166 and calculates, at a step 168, the my car speed from measured quantities other than those measured by the GPS.

Explanation will next be made as to the processing procedure of the proximity information detection interrupt 113 when a proximity information receive flag is set at the step 146 in FIG. 12, that is, when proximity information is included in information received from the base station.

Figure 17:
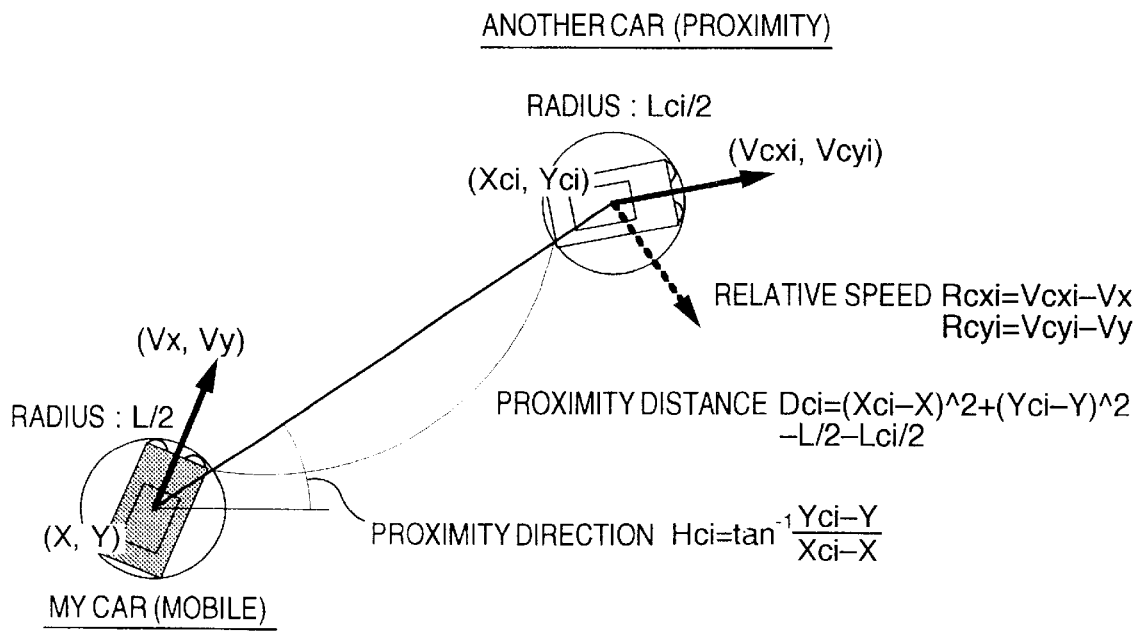
FIG. 17 is a diagram for explaining how to calculate proximity data of a step 182.

First of all, at a step 180, data regarding positions, speeds and sizes of a vehicle object (my car) and proximity objects (other cars) are input. The proximity object data are input by an amount corresponding to the number Nc of proximity objects. At a step 182, relative calculation quantities of the vehicle object (my car) relative to the proximity objects located around the my car, that is, distances Dci from my car to the proximity objects, proximity directions Hci extended from my car to the proximity objects and relative speeds Tcxi, Rcyi between my car and proximity objects are calculated in accordance with equations given in the drawing. A relationship between my car and a proximity object is shown in FIG. 17. Assuming that the position of each vehicle is determined based on the center thereof, then a distance Dci becomes a subtraction of an inter-center distance from halves of the sizes (each approximated as a circle shape) of the associated two vehicles. Also illustrated in FIG. 17 are the proximity direction Hci and relative speed Tcxi, Rcyi.

At a step 184, a difference $\Delta_{yi}$ between the proximity direction and the direction of the relative speed is calculated. The difference $\Delta_{yi}$ is calculated in the form of its absolute value and the other range is between 0 and 180 degrees. Thereafter, at a step 186, the difference $\Delta_{yi}$ is used to estimate a contact probability Cti in accordance with an equation given in the drawing. In this case, A1 and A2 are positive constants. A relationship between proximity states of other cars to my car and the contact probability Cti obtained in accordance with the above equation (assuming that the relative speeds and proximity distances to the proximity objects are constant). The contact probability Cti becomes positive when the difference $\Delta_{yi}$ is between 90 and 180 degrees (when the proximity object is nearing my car: states (3), (4) and (5) in FIG. 18); while the contact probability becomes negative when the difference $\Delta_{yi}$ is between 0 and 90 degrees (when the proximity object is going away from my car: states (1), (2) and (3) in FIG. 18). More specifically, when difference $\Delta_{yi}$=180 degrees, the proximity object is closing to my car from its front side of my car moving direction (the state (5) in FIG. 18), with the highest contact probability. When the difference $\Delta_{yi}$=0 degrees (the state (1) in FIG. 18), the relationship between my car and the other car is opposite to the above with the lowest contact probability. The relative speed Rci influences the contact probability by its absolute value. That is, the larger the absolute value of the relative speed is, the larger the contact probability is when a term of ($\Delta_{yi}$−90 degrees) is positive and the smaller the contact probability is when the term is negative. It will be clear from the state (3) in FIG. 18 that, when the relative speed is zero, the relative speed direction and thus abscissa is not determined, but the contact probability Cti becomes zero from its calculation equation. In contrast with it, since the proximity distance Dci is placed in a denominator of the equation, the proximity distance has a tendency exactly the opposite to the contact probability. That is, the smaller the proximity distance Dci is or the nearer proximity object is to my car, the higher the contact probability is. In this way, by using the computation equation of the step 186, contact probabilities in all the proximity conditions in FIG. 18 can be integrally evaluated.

It is judged at a step 188 whether or not the operations of these steps 182, 184 and 186 were repeated by the number of times corresponding to the number Nc (i=1 to nc) of the proximity objects. When the predetermined number of repetitions are completed, the system proceeds to a step 190 to select maximum one Ctmax (i=k) of the contact probabilities. In this case, for the purpose of easy understanding of the present invention, it is considered that only the maximum contact probability is selected to select one of the proximity objects having the highest contact probability to avoid its contact. However, such an arrangement may be employed as a matter of course that the contact probabilities of the other cars including the highest, second-highest and third-highest probabilities are reduced as a whole. In this case, this can be realized by controlling a contact avoidance control interrupt (which will be explained later) in such a manner as to average the contact probabilities of my car with the respective proximity objects. When the proximity objects are cars, data about a white line forming a lane may be regarded as a sort of proximity object, in which case the contact probabilities of the proximity objects other than the white line data are preferentially lowered.

Figure 15:
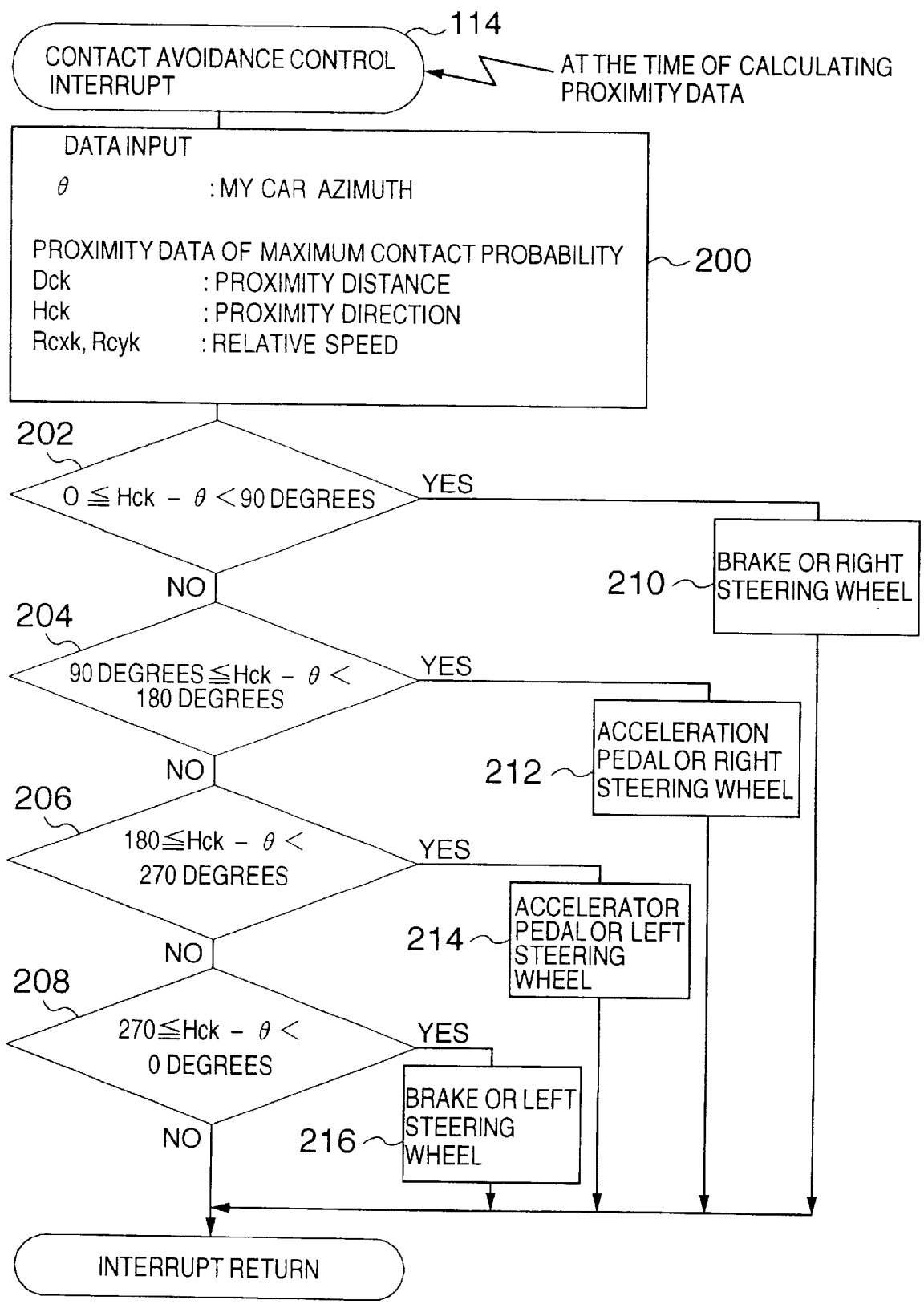
FIG. 15 is a flowchart of a contact avoidance control interrupt in FIG. 11.

Explanation will then be made as to the processing procedure of the contact avoidance control interrupt 114 to be executed when proximity data was calculated in the proximity information detection interrupt 113, by referring to FIG. 15.

At a step 200, my car azimuth data, proximity data having the largest contact probability (i=k), that is, proximity distance, proximity direction and relative speed are input. At steps 202, 204, 206 and 208, their operations are branched depending on to which angle quadrant a difference between proximity direction Hck and my car azimuth θ belongs. The step 202 is when the proximity object is located in an obliquely forward left direction of my car (0≦Hck−θ<90 degrees). In order to avoid the contact with the proximity object, at the step 210, the system controls its brake or right steering wheel. The step 204 is when the proximity object is located in a backward left direction, in which case the system control its accelerator pedal and right steering wheel in a step 212. The step 206 is when the proximity object is located in a backward right direction, in which case the system controls its accelerator pedal and left steering wheel in a step 214. The step 208 is when the proximity object is located in a forward right direction, in which cast the system controls the brake or left steering wheel in a step 216. Through the above operations, my car can avoid any contact with the proximity object. Although contact avoidance logic has been formed only paying attention to the direction of the proximity object in this example, finer control may be realized by additionally using other proximity data, e.g., proximity distance, relative speed or other data.

Figure 16:
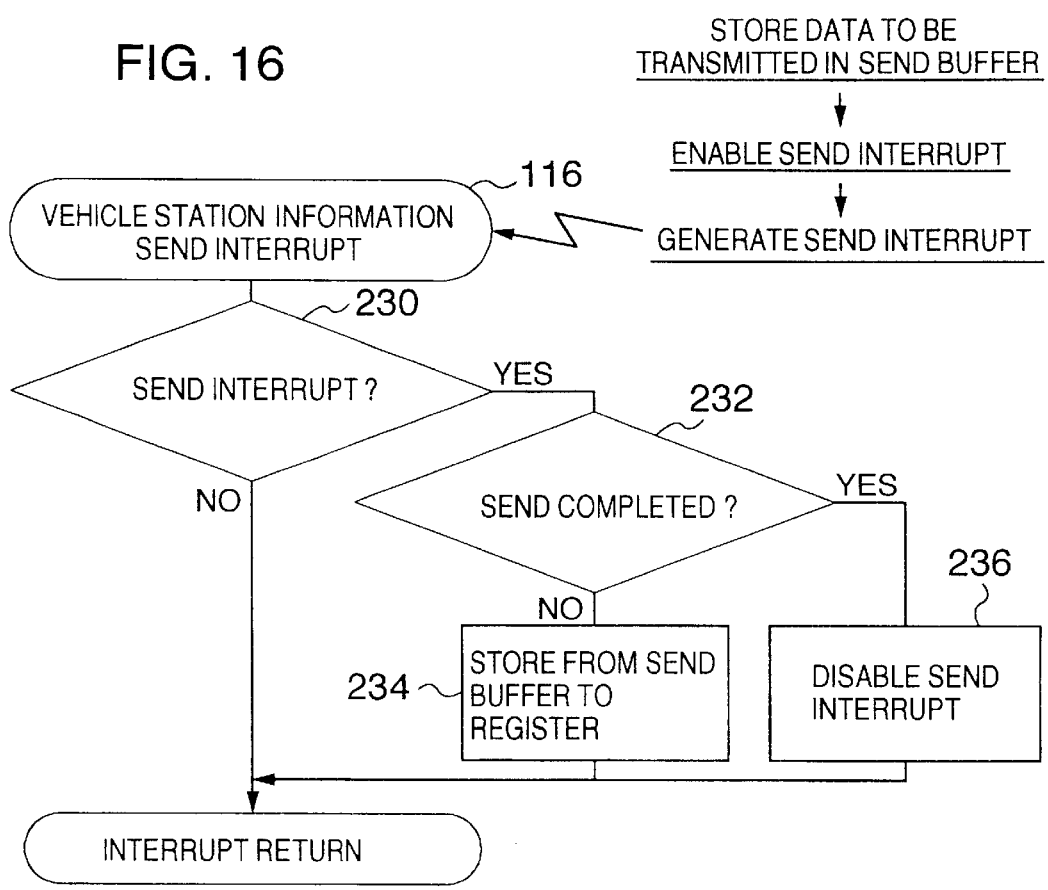
FIG. 16 is a flowchart of a vehicle information transmission interrupt.

Explanation will next be made as to the processing procedure of the vehicle station information send interrupt 116 to be executed at the time of transmitting to the base station accurate data of position and speed obtained from the vehicle object (my car), by referring to FIG. 16.

First of all, data to be transmitted is stored in a transmit buffer so that, permission of its transmit interruption causes the transmit interrupt to take place, thus starting the vehicle station information transmit interrupt. At a step 230, the interrupt factors are analyzed to judge whether or not it is a transmit interrupt. In the case of a transmit interrupt, the system goes to a step 232 to judge whether or not the transmission has been completed. Determination of the transmission completion causes the system to set the send interrupt in its disable state at a step 236. When the transmission is still being carried out, the system goes to a step 234 to shift the data from the send buffer to a register. Thereafter, the hardware automatically executes the transmitting operation. This interrupting operation is repeated until the send interrupt is disabled at the step 236.

In this manner, the data of my car sent to the base station is sent to the other cars as proximity data so that the other cars can perform contact avoidance control based on a logic similar to the above.

In accordance with the vehicle control system, vehicle control apparatus and vehicle information provider of the present embodiments, when such an accurate satellite position measuring system as the D-GPS or RTK-GPS is employed, the base station can be used as a base station of an automatic driving system, its communication means can be used also as means for informing the respective vehicle objects of the information of peripheral proximity objects, and thus automatic driving of the vehicle object can be realized under control of the base station with a high accuracy of the order of cm, low costs and a high reliability.

Further, when the present invention is applied to cars, since detail road data containing lane information necessary for keeping the running lane also can be easily created with a high accuracy by measuring it by cars having the D-GPS or RTK-GPS carried therein, there can be provided a vehicle control system, my car azimuth and vehicle information provider which can be remarkably reduced in its costs when compared with the costs of infrastructure upgrading with use of magnetic nails and maintenance costs.

What is claimed is:

1. A vehicle control system, comprising:
    a group of vehicles, each vehicle having positioning means, information receiving means and information transmitting means;
    a plurality of base stations, each base station having information receiving means for receiving first information relating to respective vehicles in said group of vehicles, and also having information transmitting means for transmitting second information relating to selected other ones of said vehicles in said group of vehicles to a specific vehicle in said group of vehicles;
    wherein said specific vehicle has selection means for selecting the second information received from the plurality of base stations, and base station selection means for selecting base station information to be used from among the plurality of base stations based upon vehicle position information; and
    further wherein, during selection, distances from said specific vehicle to said plurality of base stations are calculated, and the base station information from the base station having the shortest distance to the specific vehicle is selected.

2. The vehicle control system according to claim 1, wherein, during selection, said base station selection means calculates distances from said specific vehicle to said plurality of base stations while considering an advancing direction of said specific vehicle, and selects one of the plurality of base stations located in the advancing direction even if said one base station is further from the specific vehicle than other ones of said plurality of base stations.

\* \* \* \* \*